(12) United States Patent
Roper

(10) Patent No.: US 9,537,760 B2
(45) Date of Patent: Jan. 3, 2017

(54) EXECUTING LOOPS

(71) Applicant: Entuity Limited, London (GB)

(72) Inventor: Jeffrey John Roper, Longfield (GB)

(73) Assignee: ENTUITY LIMITED, London (GB)

( * ) Notice: Subject to any disclaimer, the term of this patent is extended or adjusted under 35 U.S.C. 154(b) by 0 days.

(21) Appl. No.: 14/584,041

(22) Filed: Dec. 29, 2014

(65) Prior Publication Data

US 2015/0295816 A1 Oct. 15, 2015

(30) Foreign Application Priority Data

Apr. 11, 2014 (GB) .................................. 1406568.4

(51) Int. Cl.
*H04L 12/24* (2006.01)
*H04L 12/721* (2013.01)
(Continued)

(52) U.S. Cl.
CPC ............... *H04L 45/26* (2013.01); *H04L 41/14* (2013.01); *H04L 41/147* (2013.01); *H04L 45/02* (2013.01); *H04L 45/04* (2013.01)

(58) Field of Classification Search
CPC ........ H04L 41/12; H04L 41/147; H04L 45/02; H04L 45/08; H04L 45/14
(Continued)

(56) References Cited

U.S. PATENT DOCUMENTS

| | | |
|---|---|---|
| 5,675,741 A | 10/1997 | Aggarwal et al. |
| 5,802,278 A | 9/1998 | Isfeld |

(Continued)

FOREIGN PATENT DOCUMENTS

| | | |
|---|---|---|
| EP | 1737169 A1 | 12/2006 |
| EP | 1916812 A1 | 4/2008 |

(Continued)

OTHER PUBLICATIONS

U.S. Appl. No. 61/081,652, filed Jul. 17, 2008, Lingping Gao.
(Continued)

*Primary Examiner* — Patrice Winder
(74) *Attorney, Agent, or Firm* — Knobbe, Martens, Olson & Bear LLP

(57) ABSTRACT

A method of executing a loop computer program comprising receiving at an execution unit a set of state variables which define an entry state, wherein one of the state variables defines a sequence of loop options; recording the entry state in a storage unit; in the execution unit, executing a first loop option in the ordered sequence of loop options in the entry state, using as parameters at least one of the other state variables in the set of state variables, wherein executing the first loop option comprises cancelling the first loop option from the ordered sequence, carrying out processing steps using at least one state variable, and determining if any of the state variables have altered as a result of the processing steps, wherein if none of the state variables have altered, entering a next loop iteration with an entry state in which the first loop option is cancelled from the ordered sequence, revealing a new first loop option, and; if at least one of the state variables has altered, reinstating the cancelled first loop option in the ordered sequence and entering a next loop iteration with an entry state defined by the altered state variable(s) and the original ordered sequence, whereby each next loop iteration receives a new entry state.

3 Claims, 31 Drawing Sheets

(51) Int. Cl.
*H04L 12/751* (2013.01)
*H04L 12/715* (2013.01)

(58) Field of Classification Search
IPC .................. H04L 41/12,41/14, 41/147, 45/02, H04L 45/08, 45/14, 45/26
See application file for complete search history.

(56) References Cited

U.S. PATENT DOCUMENTS

| | | | |
|---|---|---|---|
| 5,835,720 A | 11/1998 | Nelson et al. | |
| 5,999,536 A | 12/1999 | Kawafuji et al. | |
| 6,023,733 A | 2/2000 | Periasamy | |
| 6,265,104 B1 | 7/2001 | Hull | |
| 6,611,872 B1 | 8/2003 | McCanne | |
| 6,778,496 B1* | 8/2004 | Meempat | H04L 45/22 370/230 |
| 6,977,924 B1 | 12/2005 | Skoog | |
| 7,023,811 B2 | 4/2006 | Pinto | |
| 7,042,912 B2 | 5/2006 | Ashwood-Smith | |
| 7,089,293 B2 | 8/2006 | Grosner | |
| 7,110,356 B2 | 9/2006 | Illikkal | |
| 7,133,929 B1 | 11/2006 | Shah | |
| 7,136,642 B1 | 11/2006 | Massie | |
| 7,269,157 B2* | 9/2007 | Klinker | H04L 45/22 370/228 |
| 7,340,169 B2 | 3/2008 | Ovadia | |
| 7,414,981 B2* | 8/2008 | Jaramillo | H04L 51/18 370/252 |
| 7,428,237 B1* | 9/2008 | Gai | H04L 41/0663 370/225 |
| 7,760,735 B1 | 7/2010 | Chen | |
| 7,774,474 B2 | 8/2010 | Ashwood-Smith | |
| 7,870,200 B2 | 1/2011 | Slater | |
| 8,176,006 B2 | 5/2012 | Lin | |
| 8,200,871 B2 | 6/2012 | Rangan | |
| 8,238,253 B2 | 8/2012 | Morrill | |
| 8,274,905 B2 | 9/2012 | Edwards | |
| 8,325,720 B2 | 12/2012 | Gao | |
| 8,386,593 B1 | 2/2013 | Gao | |
| 8,386,937 B1 | 2/2013 | Gao | |
| 8,407,765 B2 | 3/2013 | Wiley | |
| 8,694,627 B2 | 4/2014 | Gerber | |
| 8,717,911 B2 | 5/2014 | Bugenhagen | |
| 8,804,746 B2 | 8/2014 | Wu | |
| 8,891,536 B2 | 11/2014 | Han | |
| 9,077,760 B2 | 7/2015 | McKeown | |
| 2003/0208572 A1 | 11/2003 | Shah | |
| 2003/0211839 A1 | 11/2003 | Baum et al. | |
| 2005/0018667 A1 | 1/2005 | Chandra et al. | |
| 2005/0044268 A1 | 2/2005 | Johnston-Watt | |
| 2005/0240386 A1* | 10/2005 | Carballo | H04L 41/0896 703/14 |
| 2006/0140136 A1 | 6/2006 | Filsfils | |
| 2007/0002869 A1 | 1/2007 | Miller | |
| 2007/0053359 A1 | 3/2007 | Wu et al. | |
| 2007/0171844 A1 | 7/2007 | Loyd | |
| 2007/0280253 A1 | 12/2007 | Rooholamini | |
| 2009/0034419 A1 | 2/2009 | Flammer | |
| 2009/0147692 A1 | 6/2009 | Hasan et al. | |
| 2009/0190478 A1 | 7/2009 | Li et al. | |
| 2010/0080131 A1 | 4/2010 | Ward et al. | |
| 2010/0287548 A1 | 11/2010 | Zhou | |
| 2010/0306360 A1 | 12/2010 | Duggan | |
| 2011/0047262 A1 | 2/2011 | Martin et al. | |
| 2011/0142054 A1 | 6/2011 | Scholl et al. | |
| 2011/0274111 A1 | 11/2011 | Narasappa et al. | |
| 2011/0317700 A1 | 12/2011 | Assarpour | |
| 2012/0131211 A1 | 5/2012 | Schemitsch | |
| 2012/0218994 A1 | 8/2012 | Zheng | |
| 2013/0042020 A1 | 2/2013 | Stiffler et al. | |
| 2013/0287038 A1 | 10/2013 | Zhou et al. | |
| 2014/0036729 A1 | 2/2014 | Thubert et al. | |
| 2014/0250225 A1 | 9/2014 | Sellers | |
| 2014/0280831 A1 | 9/2014 | Gao | |
| 2014/0280833 A1 | 9/2014 | Gao | |
| 2014/0310243 A1* | 10/2014 | McGee | G06F 17/30575 707/639 |
| 2014/0313931 A1 | 10/2014 | Roper | |
| 2014/0313937 A1 | 10/2014 | Roper | |
| 2014/0314086 A1 | 10/2014 | Roper | |
| 2014/0317279 A1 | 10/2014 | Roper | |
| 2014/0341109 A1 | 11/2014 | Cartmell | |
| 2014/0347982 A1 | 11/2014 | Ozawa | |
| 2014/0365682 A1 | 12/2014 | Morris | |
| 2015/0244617 A1 | 8/2015 | Nakil | |

FOREIGN PATENT DOCUMENTS

| | | |
|---|---|---|
| EP | 2413550 A1 | 2/2012 |
| EP | 2541852 A1 | 1/2013 |
| GB | 2460534 A | 12/2009 |
| GB | 2462493 A | 2/2010 |
| GB | 2513188 A | 10/2014 |
| WO | WO 96/13108 A2 | 2/1996 |
| WO | WO 2009/152017 A1 | 12/2009 |
| WO | WO 2011/046751 A1 | 4/2011 |

OTHER PUBLICATIONS

U.S. Appl. No. 61/083,995, filed Jul. 28, 2008, Lingping Gao.
International Search Report and Written Opinion for PCT Application No. PCT/EP2013/060986, dated Aug. 7, 2013.
International Search Report and Written Opinion for PCT Application No. PCT/EP2014/057963, dated Jul. 16, 2014.
International Search Report and Written Opinion for PCT Application No. PCT/EP2014/057965, dated Jun. 16, 2014.
International Search Report and Written Opinion for PCT Application No. PCT/EP2014/079318, dated Jan. 29, 2015.
Search Report for Application No. GB1307129.5, dated May 14, 2015.
Search Report for Application No. GB1406965.2, dated Sep. 30, 2014.
Combined Search and Examination Report for Application No. GB1406568.4, dated Nov. 14, 2014.
Combined Search and Examination Report for Application No. GB1406958.7, dated Nov. 17, 2014.
International Search Report and Written Opinion for PCT/EP2014/057962, dated Jul. 9, 2014.
U.S. Appl. No. 14/255,815, filed Apr. 17, 2014.
U.S. Appl. No. 14/255,866, filed Apr. 17, 2014.
U.S. Appl. No. 14/255,835, filed Apr. 17, 2014.
U.S. Appl. No. 14/255,844, filed Apr. 17, 2014.
GB Search Report for Application No. 1307129.5, dated Dec. 9, 2013.
GB Combined Search and Examination Report for Application No. 1406963.7, dated Oct. 9, 2014.
GB Examination Report for Application No. 1406963.7, dated May 14, 2015.
U.S. Appl. No. 14/255,815, Identification of Paths in a Network of Mixed Routing/Switching Devices, filed Apr. 17, 2014.
U.S. Appl. No. 14/255,866, Identification of the Paths Taken Through a Network of Interconnected Devices, filed Apr. 17, 2014.
U.S. Appl. No. 14/255,835, Querying a Traffic Forwarding Table, filed Apr. 17, 2014.
U.S. Appl. No. 14/255,844, Identifying an Egress Port of a Device, filed Apr. 17, 2014.

* cited by examiner

```
ipRouteEntry OBJECT-TYPE
-- 1.3.6.1.2.1.4.21.1
-- iso(1).org(3).dod(6).internet(1).mgmt(2).mib-2(1).ip(4).ipRouteTable(21).ipRouteEntry(1)
    SYNTAX          ipRouteEntry
    ACCESS          not-accessible
    INDEX { ipRouteDest }                    ──── 48
    DESCRIPTION
        "A route to a particular destination."
  ::= { ipRouteTable 1 } ipRouteEntry
  ::=
  SEQUENCE {
50 ──── ipRouteDest          IpAddress,
        ipRouteIfIndex       INTEGER,
        ipRouteMetric1       INTEGER,
        ipRouteMetric2       INTEGER,
        ipRouteMetric3       INTEGER,
        ipRouteMetric4       INTEGER,
52 ──── ipRouteNextHop       IpAddress,
54 ──── ipRouteType          INTEGER,
        ipRouteProto         INTEGER,
        ipRouteAge           INTEGER,
56 ──── ipRouteMask          IpAddress,
        ipRouteMetric5       INTEGER,
        ipRouteInfo          OBJECT IDENTIFIER
  }
```

Fig. 5

IP address 10.44.1.213 = 0A.2C.01.D5 = 0000 1010 0010 1100 0000 0001 1101 0101

| Prefix | Binary |
|---|---|
| /32: | 0000 1010 0010 1100 0000 0001 1101 0101 |
| /31: | 0000 1010 0010 1100 0000 0001 1101 0100 |
| /30: | 0000 1010 0010 1100 0000 0001 1101 0100 |
| /29: | 0000 1010 0010 1100 0000 0001 1101 0000 |
| /28: | 0000 1010 0010 1100 0000 0001 1101 0000 |
| /27: | 0000 1010 0010 1100 0000 0001 1100 0000 |
| /26: | 0000 1010 0010 1100 0000 0001 1100 0000 |
| /25: | 0000 1010 0010 1100 0000 0001 1000 0000 |
| /24: | 0000 1010 0010 1100 0000 0001 0000 0000 |
| /23: | 0000 1010 0010 1100 0000 0000 0000 0000 |
| /22: | 0000 1010 0010 1100 0000 0000 0000 0000 |
| /21: | 0000 1010 0010 1100 0000 0000 0000 0000 |
| /20: | 0000 1010 0010 1100 0000 0000 0000 0000 |
| /19: | 0000 1010 0010 1100 0000 0000 0000 0000 |
| /18: | 0000 1010 0010 1100 0000 0000 0000 0000 |
| /17: | 0000 1010 0010 1100 0000 0000 0000 0000 |
| /16: | 0000 1010 0010 1100 0000 0000 0000 0000 |
| /15: | 0000 1010 0010 1100 0000 0000 0000 0000 |
| /14: | 0000 1010 0010 1100 0000 0000 0000 0000 |
| /13: | 0000 1010 0010 1000 0000 0000 0000 0000 |
| /12: | 0000 1010 0010 0000 0000 0000 0000 0000 |
| /11: | 0000 1010 0010 0000 0000 0000 0000 0000 |
| /10: | 0000 1010 0000 0000 0000 0000 0000 0000 |
| /09: | 0000 1010 0000 0000 0000 0000 0000 0000 |
| /08: | 0000 1010 0000 0000 0000 0000 0000 0000 |
| /07: | 0000 1010 0000 0000 0000 0000 0000 0000 |
| /06: | 0000 1000 0000 0000 0000 0000 0000 0000 |
| /05: | 0000 1000 0000 0000 0000 0000 0000 0000 |
| /04: | 0000 0000 0000 0000 0000 0000 0000 0000 |
| /03: | 0000 0000 0000 0000 0000 0000 0000 0000 |
| /02: | 0000 0000 0000 0000 0000 0000 0000 0000 |
| /01: | 0000 0000 0000 0000 0000 0000 0000 0000 |
| /00: | 0000 0000 0000 0000 0000 0000 0000 0000 |

Fig. 6 ipNetToMediaEntry OBJECT-TYPE
 ::= 1.3.6.1.2.1.4.22.1
 -- iso(1) org(3) dod(6) internet(1) mgmt(2) mib-2(1) ip(4) ipNetToMediaTable(22) ipNetToMediaEntry(1)
    SYNTAX       ipNetToMediaEntry
    ACCESS       not-accessible
    INDEX { ipNetToMediaIfIndex, ipNetToMediaNetAddress }
    DESCRIPTION
        "Each entry contains one IpAddress to 'physical' address
        equivalence."
 ::= { ipNetToMediaTable 1 } ipNetToMediaEntry
 ::= SEQUENCE {
    ipNetToMediaIfIndex         INTEGER,
    ipNetToMediaPhysAddress     PhysAddress,
    ipNetToMediaNetAddress      IpAddress,
    ipNetToMediaType            INTEGER
 }

Fig. 7

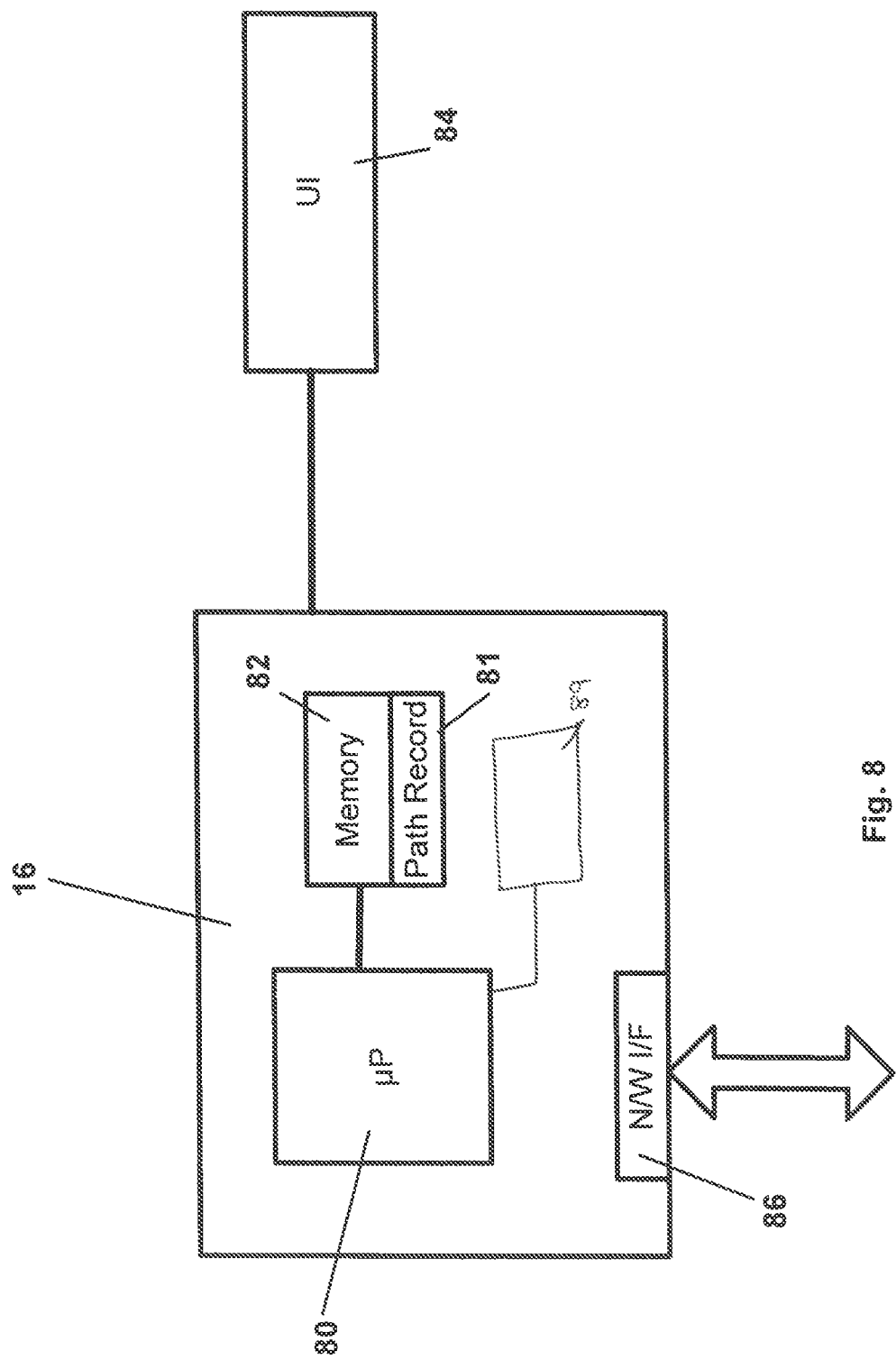

EXECUTING LOOPS

FIELD

The present disclosure relates to execution of computer program loops, particularly but not exclusively in the context of identification of a path in a network of interconnected devices.

BACKGROUND

Computer networks form the basis for IT (Information Technology) infrastructure in a wide variety of contexts. Such computer networks comprise interconnected devices of various types. The purpose of the network is to support the flow of messages between those devices so as to deliver information, applications and services, etc., over the network. A number of techniques are available for managing a network. In this context, managing a network includes monitoring the network to identify failure points and other problematic areas, such as hotspots, and providing information to administrators and users of the network to allow the problems to be fixed. There are a number of tools available for providing a network topology. The topology of a network identifies how devices in the network are physically or logically connected to each other. Thus, any particular single device may have one or more connections to a neighbour device. Computerised tools which "discover" a network are available, and they create network topologies which define the interconnection of the devices in the network, and the nature of those devices.

Determining network topology can be done in many ways. Techniques that can all be utilised separately or in combination to give a good representation of network connectivity include, for example:
  Cisco Discovery Protocol (CDP)
  Link Layer Discovery Protocol (LLDP)
  SynOptics Network Management Protocol (SoNMP)
  Spanning Tree Protocol (STP)
  IP Traceroute
  IPv6 Neighbour Discovery
  user additions/modifications/deletions Knowing the topology of a network is extremely useful, but it does not provide a solution to all of the problems which can occur. Networks are increasingly used to provide the infrastructure for supporting the delivery of applications and services between remote geographical locations, either over long distances or in extremely complex networks with a large number of interconnected devices. Increasingly, network administrators and users are interested to know not necessarily the full details of the network, but to understand the performance of the delivery of applications and services over a network. Thus, so-called "end to end" monitoring is becoming increasingly popular. With "end to end" monitoring, applications involving message flow from a source device to a destination device have their performance monitored as they are delivered between that source and destination device. The performance parameters can be used to estimate or guess at possible failures in the network, although they do not provide any specific information about the location of those failures and therefore do not point directly to a solution.

Often a source device is a server providing a particular service, and the destination device is a client terminal which is connected to the server via the network and which requires to use that service. The term "device" used herein is intended to cover any devices which can be connected in a network. The term "server" is used to denote a device which is responsible for delivering a service or application, and the term "client" is used to denote a device (either user-based or another dependent machine or server) which depends on that application or service.

A significant difficulty in guessing where a problem might lie when it can be seen that an application's performance is deteriorating is a lack of understanding about the path through the network that message flow for that application might have taken. Networks depend on many types of network devices (e.g. routers, switches, firewalls, load balancers, etc.) to connect their endpoint devices, such that it is extremely difficult to say for any given source endpoint how the message from that endpoint will be routed through the network to a given destination endpoint. The complexity of such path determination is exacerbated by the usage of multiple alternating paths, redundant paths, load balancing, etc.

Attempts have been made to predict how a particular packet will be routed through a network. Such predictions are based on a complex model of the network topology together with indications on a per device basis as to how a particular device will behave in the network. Network devices can be highly sophisticated, and there have been developed a large number of complex algorithms to determine a routing strategy at any particular device. Moreover, that routing strategy can depend on traffic and other environmental considerations which affect the network (such as failure of other devices, etc.). Complex algorithms which can be applied by a device to determine a routing strategy can include for example:
  Ingress interface and ingress interface technology
  Packet headers (L2, L3, MPLS, ATM, etc)
  Static and directly connected routes
  Shared routing tables (full knowledge of BGP, OSPF, RIP, EIGRP, etc—active neighbours, link states, route costs, route weights, etc.)
  Learned MAC forwarding tables
  Access control lists
  Network overlay technologies (e.g. MPLS, 802.1q VLANs), etc.
  Loop avoidance technologies—e.g. PVSTP
  Tunnelling protocols (MPLS, IPSEC, SSL, GRE)
  Load balanced/redundant links
  Default gateways However, even if it is in principle possible to predict where a given packet will be forwarded to next at a particular device, this requires a vast amount of data which is slow to gather, and can be out of date within seconds due to the real time nature of the operation of the routing devices. Furthermore, the mere acquisition of this data can place a significant load on both network devices and networks.

In addition, models required to simulate modern routing devices are extremely complex and, without the full model, their behaviour cannot be correctly predicted. To keep the model complete, it is necessary for such solutions to be regularly and rapidly updated to include developments in routing technologies.

SUMMARY

With the novel approach detailed here, network devices are queried as to what they would do with a hypothetical packet (as opposed to querying for routing protocol specifics). The routing protocols which feed into the devices' routing and forwarding tables need not be known or maintained.

A loop execution process has been developed by the inventors to allow efficient implementation of a path identification process. The loop execution process however has wider applicability.

It is applicable to problem solving where the problem has a number of steps and each step may be solved by a range of techniques where the techniques are ordered in terms of accuracy/desirability and it is not known a priori which technique should be applied at each step.

According to an aspect of the present invention, there is provided a method of executing a loop computer program comprising: receiving at an execution unit a set of state variables which define an entry state, wherein one of the state variables defines a sequence of loop options; recording the entry state in a storage unit; in the execution unit, executing a first loop option in the ordered sequence of loop options in the entry state, using as parameters at least one of the other state variables in the set of state variables, wherein executing the first loop option comprises cancelling the first loop option from the ordered sequence, carrying out processing steps using at least one state variable, and determining if any of the state variables have altered as a result of the processing steps, wherein: if none of the state variables have altered, entering a next loop iteration with an entry state in which the first loop option is cancelled from the ordered sequence, revealing a new first loop option, and; if at least one of the state variables has altered, reinstating the cancelled first loop option in the ordered sequence and entering a next loop iteration with an entry state defined by the altered state variable(s) and the original ordered sequence, whereby each next loop iteration receives a new entry state.

The method is particularly useful in a computer implemented method of identifying in a network of interconnected devices a path through the network from a source device to a destination device, the path comprising a connected sequence of devices, the method comprising at a monitor computer connected to the network: identifying a first device connected to the source device; transmitting a query to the first device, the query including a destination identifier and requesting identification of an egress port for messages addressed to a destination identified by the destination identifier when the query is received at the first device; receiving a result message identifying the egress port and identifying the second device connected to the first device based on a network topology accessible by the monitor computer; and addressing a next query to the second device and receiving a next result message identifying an egress port from the second device; and identifying from the network topology a third device connected to the second device, and so on, wherein the path is identified to include the first, second and subsequent devices.

When using the loop execution method, the formulation of query messages to the devices may be done by the same option repeated or different options, executed in successive loop iterations.

The path identification process utilises a novel approach to identifying the paths taken through a network of interconnected devices for a particular message flow. The concept relies on using a minimum amount of data gathered "up front"—specifically just the static network topology and end-host location (which clients and servers are connected to which access/edge switches), and gathers whatever else is required on the fly and highly selectively as required for such highly dynamic data. For modern dynamic environments, the ability to compute end-to-end path now, that is, in real time, has wide applicability. The gathering of the data and it's processing needs to be very quick for the algorithm to be of practicable value when used with large scale, real-world networks.

Behaviour at a particular device is termed "per hop behaviour" (PHB). PHB on its own cannot provide an end-to-end path. However, knowing that a packet leaves the device on a specific interface can be of value if it is not known which device and interface are connected to that interface. By using network topology coupled with PHB, direct computation of an end-to-end path through the network for an application flow can be accomplished.

Thus, the network topology includes both network device interconnectivity and end host location. In turn, the source and destination devices used to seed the path finding algorithm are determined by the message flow of interest. Finally, the specific path taken by a hypothetical packet between source and destination devices is computed dynamically.

The query which is transmitted to each device is adapted to query each device to determine the identification of an egress port which represents the egress ports that the device would use for a hypothetical message addressed to a destination identified by the destination identifier. Note that the destination identifier for any given query may or not be the terminal device's destination identifier depending on the location in the network of the device being queried. This can be achieved when the device is a router by querying what is in its active routing table at the time at which the query is received.

The query itself can be accommodated in a message or signal transmitted from the monitor computer to the device which is being queried (focus device). The query message or signal does not constitute the message flow for which the path is to be determined. Instead, each query contains a destination identifier which queries the focus device to find out how the focus device would handle a hypothetical message addressed to that destination if it had to make the decision at the time the query was received. Thus, the focus device returns a result which identifies an immediate egress port which would have been used at that time for a real message addressed to that destination. The queries can be transmitted while the network is active and while the message flow is in place. However, they can also be transmitted when the message flow itself is not active—the technique can be used in either context.

Where the query is in the form of a message or packet, for example, the message can be an SNMP message with a destination IP address, it will carry its own destination address and be delivered over the network from the monitor computer to the focus device. In that case, the destination address of the query message is that of the focus device. This is not the same as the destination identifier which is included in the query itself. In an alternative arrangement, a query signal or signals can be sent from the monitor computer through direct connections to the focus devices, such as through a CLI or XML API mechanism.

The method described herein enables a number of useful network analysis techniques. It allows for on-demand path determination so that an administrator trying to determine the path for a particular application can more or less instantaneously ask the monitor computer and receive a result of the path.

It enables multiple path discovery. That is, due to changes in the environment in the network, routing devices can route a message flow differently depending on those changes. Thus, a first set of queries to identify a path might record a first path, whereas a second set of queries might identify a second path, even when the first and second set of queries are very close to each other in time. Information about multiple paths between common endpoints (that is, the same source device and same destination device) can be presented graphically or visually to show a user not only the nature of the path, but the percentage of time each path is adopted for a particular message flow. This can be readily achieved because the queries themselves do not represent a significant overhead to the network, and therefore multiple sets of queries can be despatched without significantly affecting performance.

The method allows for the detection of rapid legitimate path change. That is, an adjustment to the network can cause the path to change and this can be detected and flagged to a user at a visual graphical user interface.

Where there are multiple paths between common source and destination devices, the paths can carry different latencies. Sometimes, a routing device performing intelligent routing can cause a phenomenon known as "route flap" where a particular message flow continually switches from path-to-path. It can be useful for a network administrator to identify these occurrences due to the implications of such path changes on end to end latency and the implications of such "jitter" on Voice over IP telephone conversations, for example.

The method can be used to locate path failure. That is, in the preferred embodiment of the method, queries are despatched and results received and analysed to identify the next device until a device is identified as the destination device. Sometimes, however, there is a failure in the network, such that the network would not deliver the message flow to the destination device. The method allows for identification of that situation by working along an end to end path until the path can traverse no further and this network location can then be notified to an administrator.

Furthermore, the method can allow for the possibility of restarting at a subsequent device in that path, using estimates based on the network topology (referred to herein as "skipping"). The path identification method can then be adopted again until the destination device is reached from the point of failure. In this way portions of the network for which the monitoring computer has no visibility (e.g. devices which have no appropriate management interface, or which belong to a different organisation) may be circumnavigated and the path analysis continue.

The method also allows for asymmetric routing identification. It is not uncommon for message flow between a source device and a destination device to adopt different paths depending on its direction. That is, a forwards path can be utilised from the source device to the destination device for the message flow, and a return path from the destination device to the source device which is different.

The path is recorded in a memory or store at the monitor computer or accessible by the monitor computer. The path record comprises a set of connected devices and interfaces. This can be presented in the form of an ordered inventory of the devices (network components) between the two endpoints. This enables network path availability monitoring, including event notification, reporting, SLA's (Service Level Agreements); proactive network management including reporting on failing devices, high device CPU, low device memory, port congestion, etc., and impact analysis (capacity planning, "what if" analysis).

It is a significant advantage of aspects of the present invention that a mapping between the application or service delivered by the network and the network devices or components themselves can be ascertained through the identification of the path. This represents a significant step forwards in the management of networks.

According to another aspect of the present invention there is provided a computer system for executing a loop computer program, the computer system comprising a processor operable to execute a loop execution method and storage means for recording the entry state.

The system can be used as a monitoring computer system for identifying in a network of interconnected devices a path through the network from a source device to a destination device, the computer system comprising: an interface connected to the network for transmitting queries and receiving responses; a second storage means for storing a path record; and a third storage means storing a network topology.

A further aspect of the present invention provides a computer program product which comprises computer readable instructions which when executed by a processor implements the method as herein defined.

For a better understanding of the present invention and to show how the same may be carried into effect, reference will now be made by way of example, to the accompanying drawings, in which:

BRIEF DESCRIPTION OF THE DRAWINGS

FIG. 5 is the structure of a linear routing table;
FIG. 6 illustrates a set of results arising from combining a destination address with multiple route masks;
FIG. 7 shows a structure of an ARP table;
FIG. 8 is a schematic diagram of a monitor computer.

DESCRIPTION OF EMBODIMENTS

Figure 1:
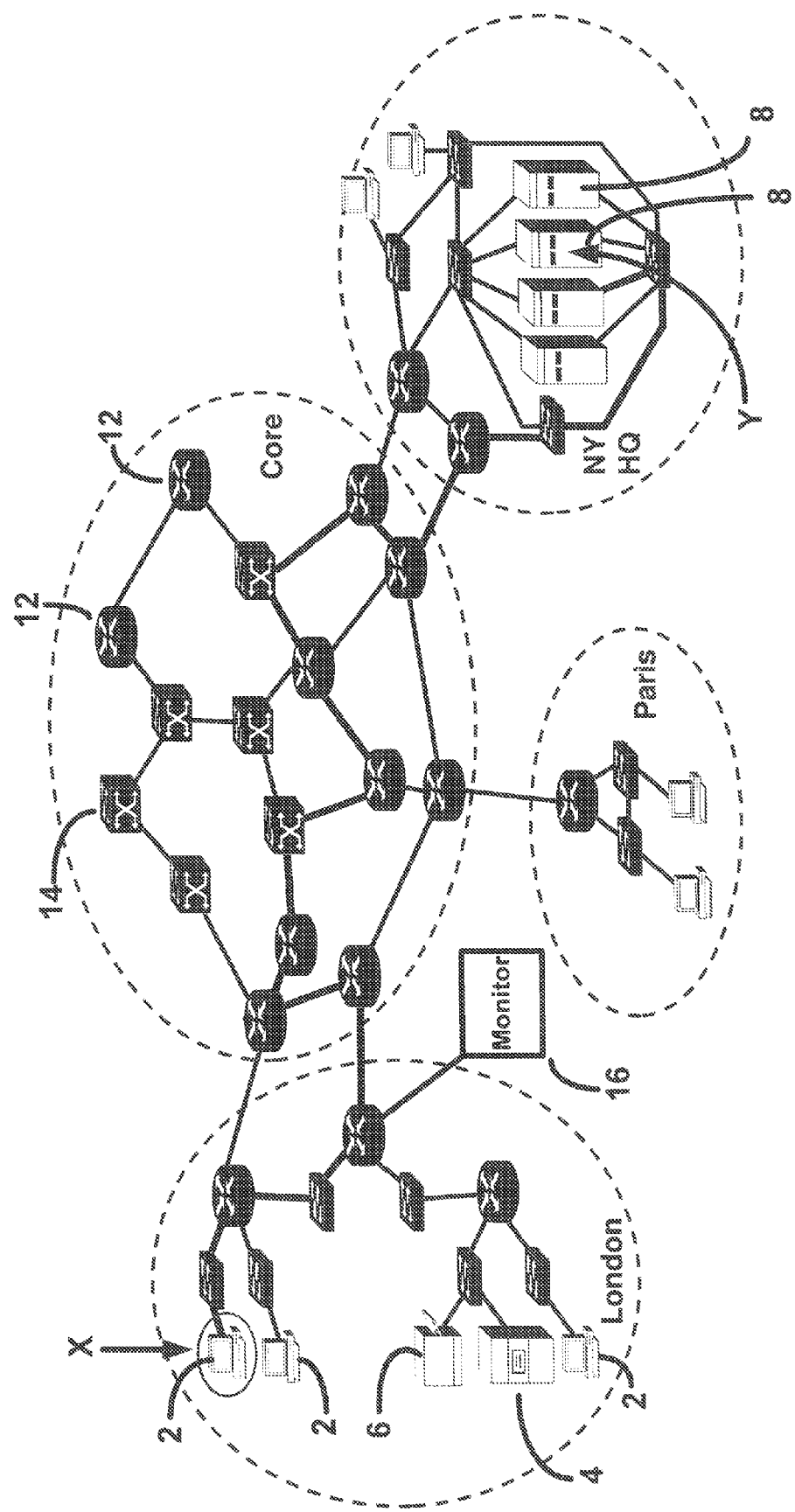
FIG. 1 is a schematic diagram of a network.

FIG. 1 is a schematic diagram of a network. The network extends over a number of different geographical locations. At each end geographical location there are endpoint devices and network devices or nodes. The network devices include routers and switches. The core of the network comprises a plurality of network devices. Considering the geographical location marked London, client terminals 2 can act as endpoint devices. Similarly, a server 4 can act as an endpoint device and the printer 6 can be considered an endpoint device. Similar devices are shown in the Paris and New York geographical locations with different layouts (New York showing a server farm or data centre). Note that at the New York location a plurality of servers 8 represent key application or service endpoint devices.

It should be appreciated that the network shown in FIG. 1 is given by way of one example. There is a wide variety of possible networks and the present invention can be used in any network of interconnected devices. In particular, the nature of the endpoint devices and specific network devices or nodes can vary. In the particular network which is disclosed, the network devices can be layer 3 or layer 2 devices.

The OSI (Open Systems Interconnection) model defines seven layers within which communication systems' protocols can be characterised. The path finding algorithm described here computes network paths using information available at layers 2 and 3.

Devices operating at layer 2 (the Data Link Layer) have knowledge of immediately adjacent devices and have responsibility for getting packets from one layer 2 device to the next layer 2 device (based on layer 2 MAC (Media Access Control) address).

Devices operating at layer 3 (the Network Layer) are responsible for propagating packets from one point in a network to another point in the network—often many tens or hundreds of devices apart. To compute which devices should participate in a given layer 3 path (herein referred to as the layer 3 hops), layer 3 devices exchange routing information and use routing protocols to compute the most desirable path(s). To pass packets between consecutive layer 3 devices in a path, devices operating at layer 2 are used; often with many layer 2 devices (herein referred to as the layer 2 hops) between each layer 3 device.

Thus large networks are effectively subdivided into multiple segments, each typically containing multiple layer 2 devices, connected by layer 3 devices.

Figure 9:
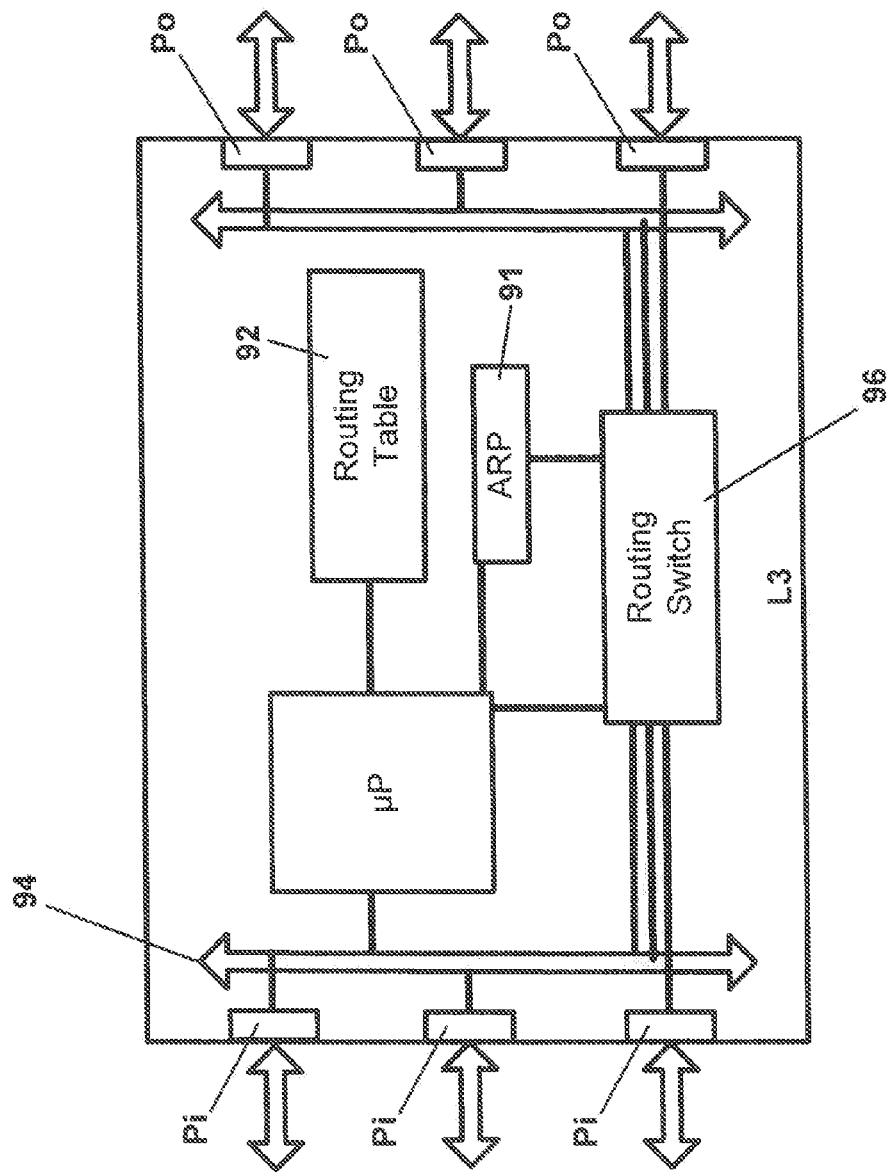
FIG. 9 is a schematic diagram of a layer 3 router.

FIG. 9 is a highly schematic diagram of a layer 3 routing device. The device comprises a controller 90 for example, in the form of a microprocessor running controlling code, firmware or any other suitable implementation. The controller 90 can access a routing table 92 which is discussed in more detail later with reference to FIG. 5. The layer 3 routing device has ports Pi/Po. Each port is connected to a physical link as illustrated in the network of FIG. 1. In this notation, Pi denotes an "ingress" port and Po denotes an "egress" port. This is for convenience of notation, in practice, devices do not usually have ports which are dedicated as ingress or egress ports—whether they are ingress or egress depends on the data they are transferring at the time. Most ports function as egress and ingress all of the time.

Packets arriving at an ingress port Pi can have their destination identifiers, e.g. IP (Internet Protocol Addresses) read by the controller 90 via a bus 94. The controller 90 accesses the routing table 92 and based on information derived therefrom controls a routing switch 96 to which the incoming packet is directed. The routing switch 96 then routes the incoming packet to an appropriate egress port Po depending on the information in the routing table. The routing device includes a mapping table 91 which maps layer 3 to layer 2 addresses for subsequent routing. Operation of such routing devices are known in the art and so will not be described further herein. It is noted in this context that the routing table can be queried by packets from the monitor computer arriving over the links into the ingress port Pi by intercepting such packets at the controller 90. Such query packets are not supplied to the routing switch 96 for further routing, but instead generate a response which is output from the routing device and returned to the enquiring entity over the network from an egress port. In this case, that enquiring entity is the monitor computer 16.

All packets conveyed over the network (including query packets) contain a source and a destination address—the query packet has a source address corresponding to the monitor computer and a destination address corresponding to the device being queried. When the reply needs to be sent, the source and destination addresses are swapped to make the source address the device being queried and the destination address the monitor computer.

Figure 10:
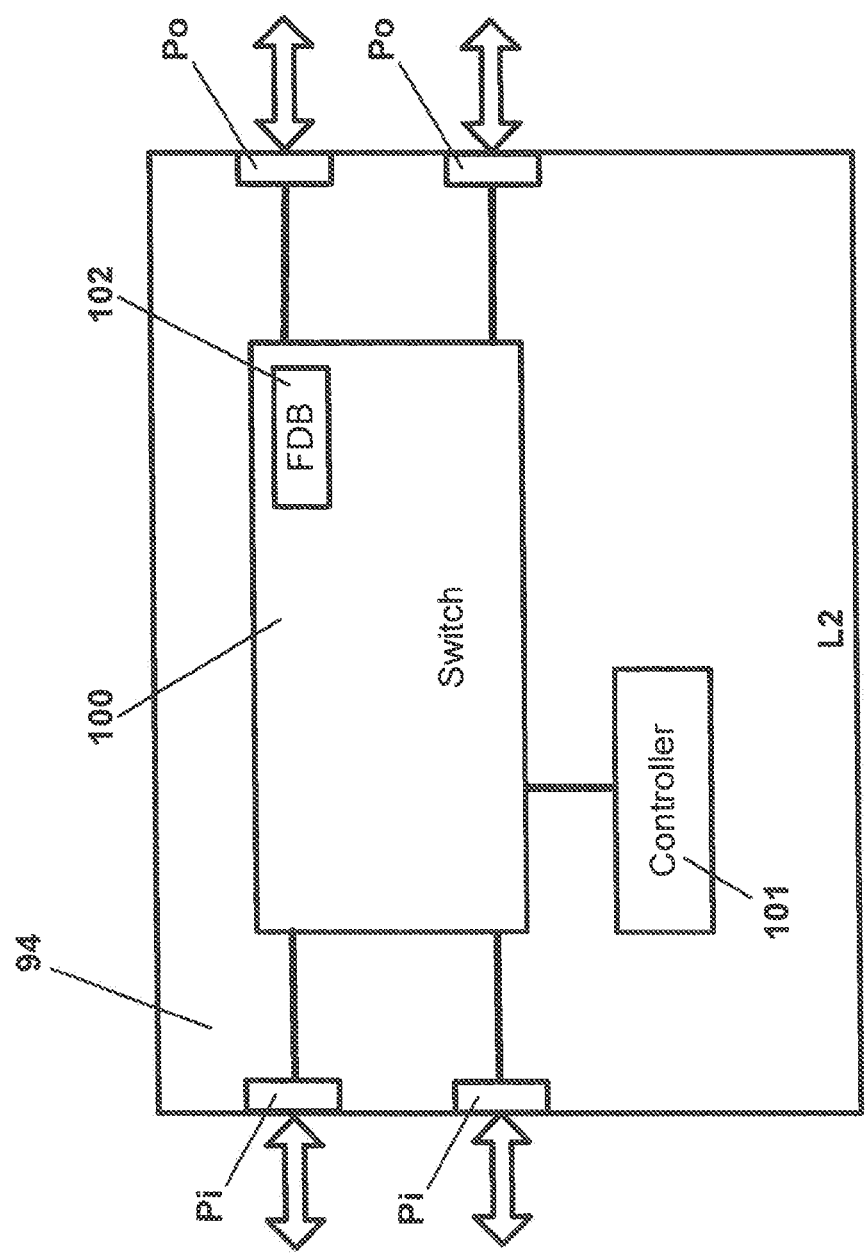
FIG. 10 is a schematic diagram of a layer 2 switch.
Figure 11A:
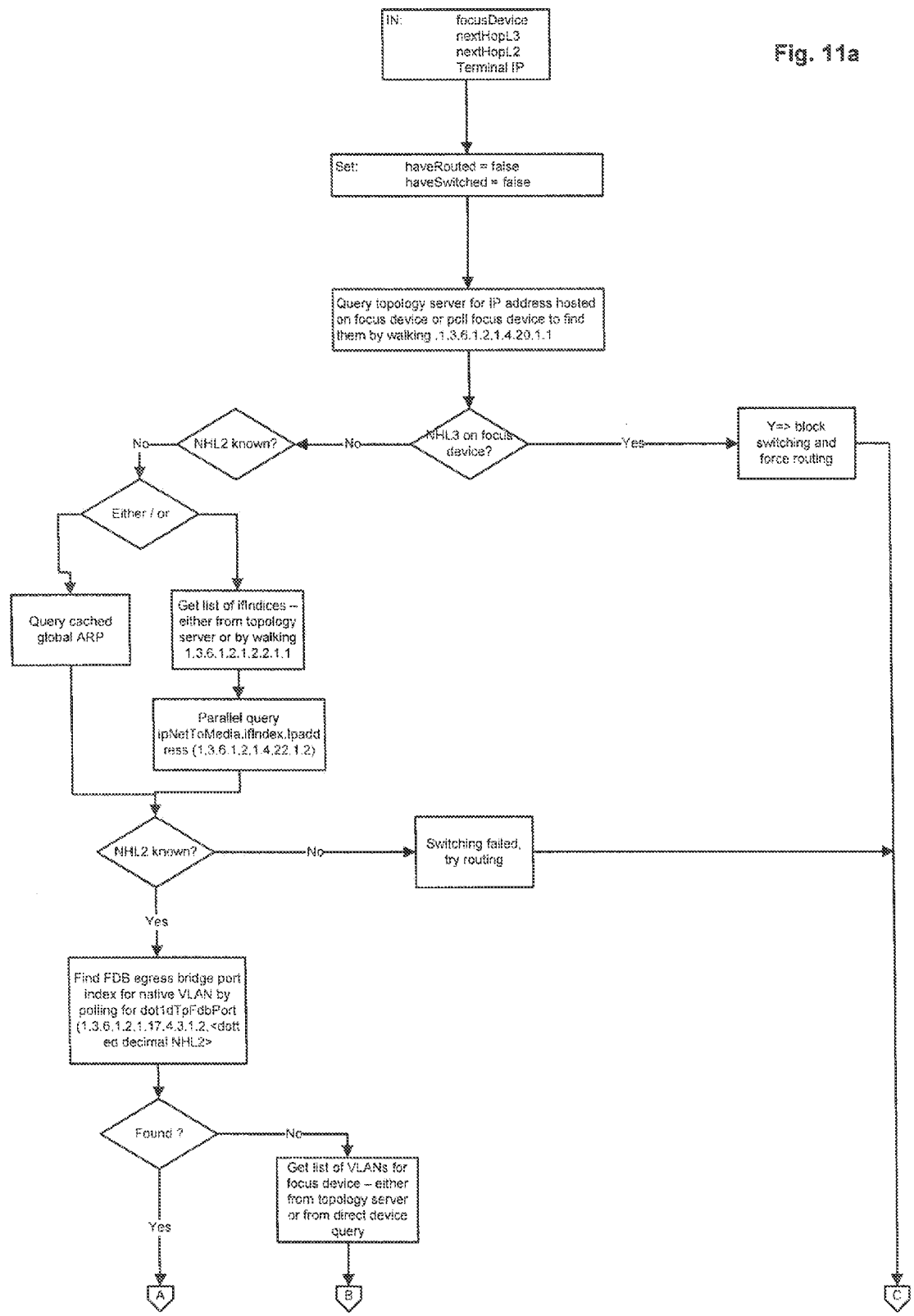
FIGS. 11a to 11d are a flow chart of a utility executed at the monitor computer.
Figure 11B:
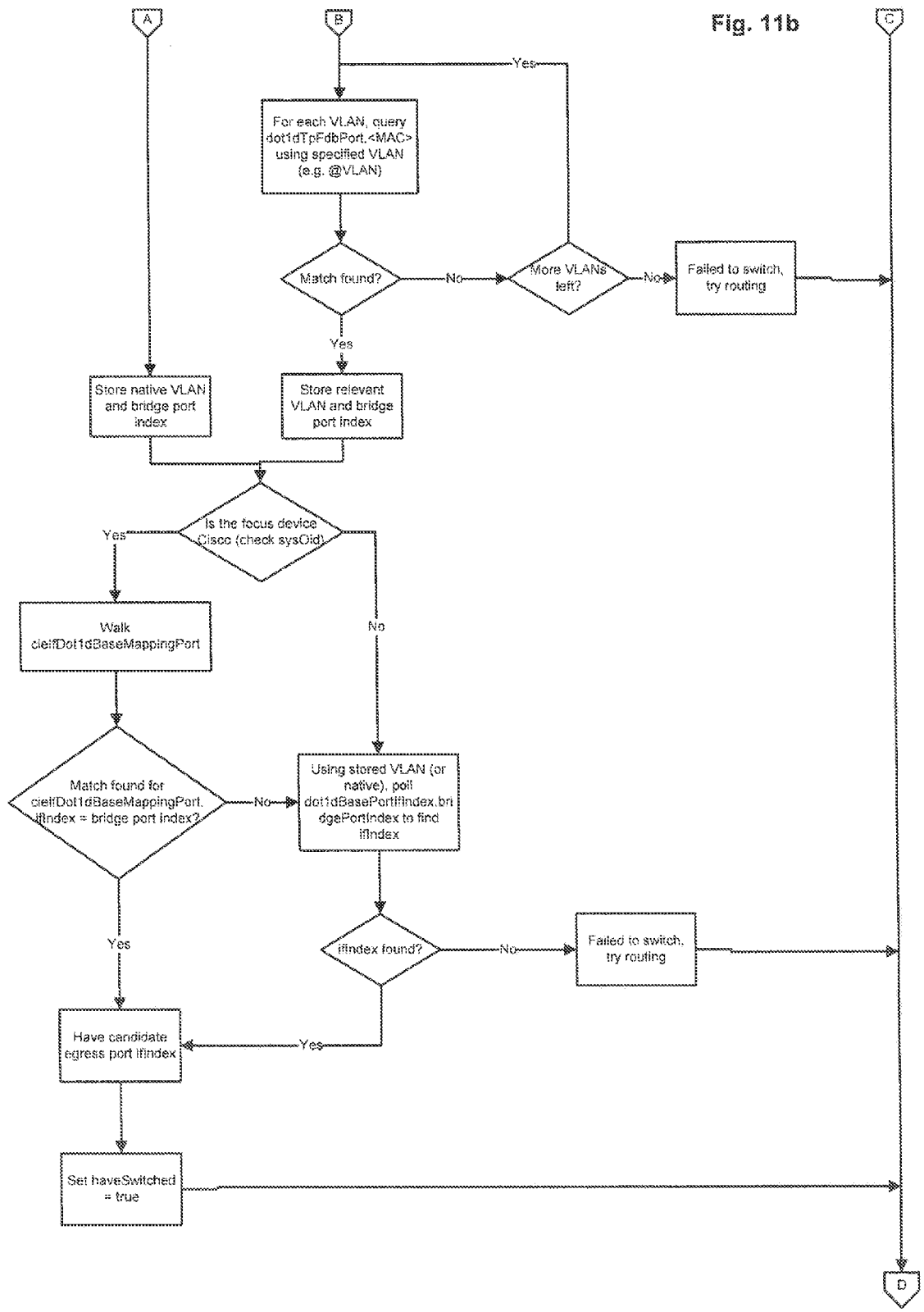
Figure 11C:
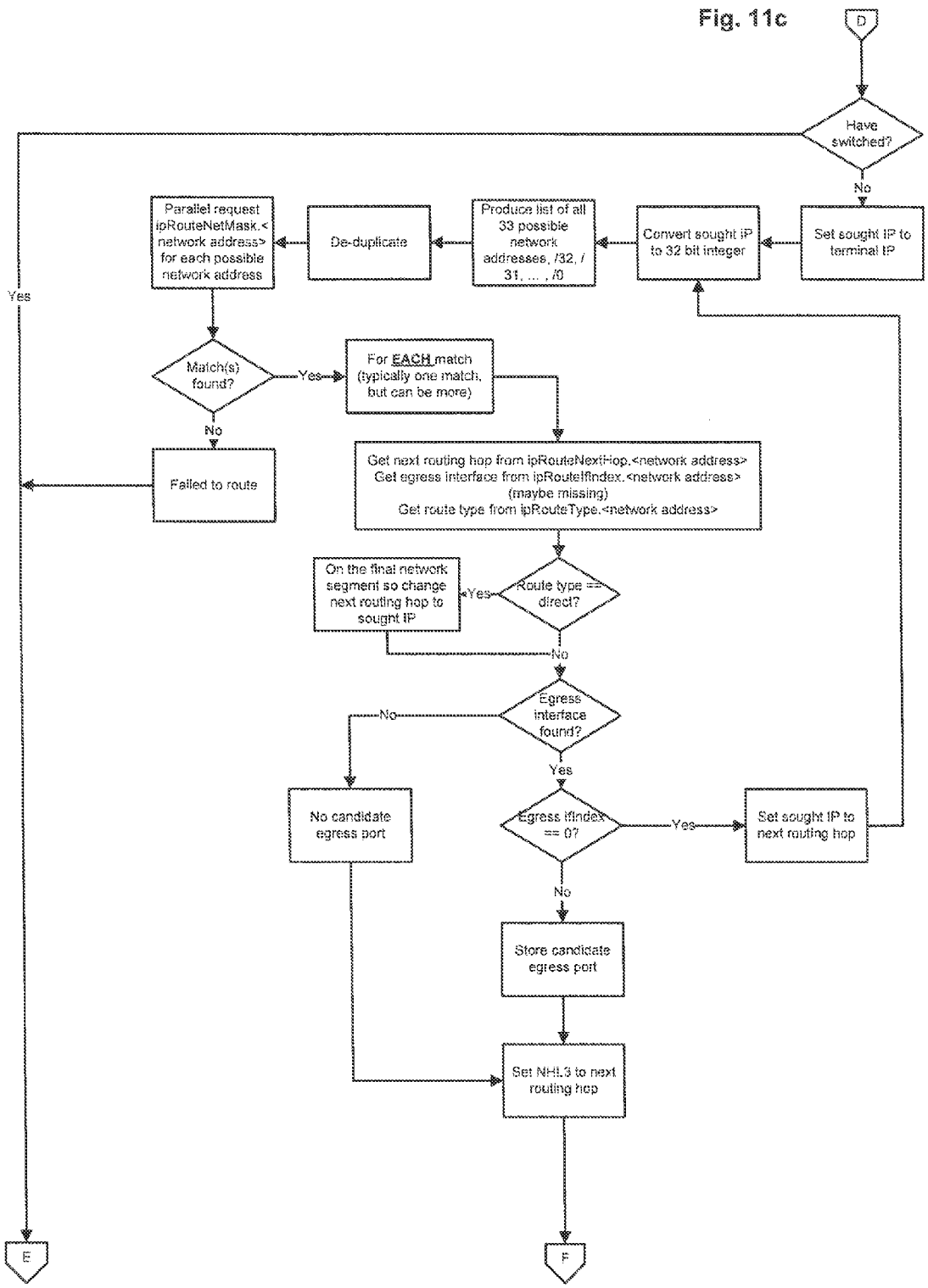
Figure 11D:
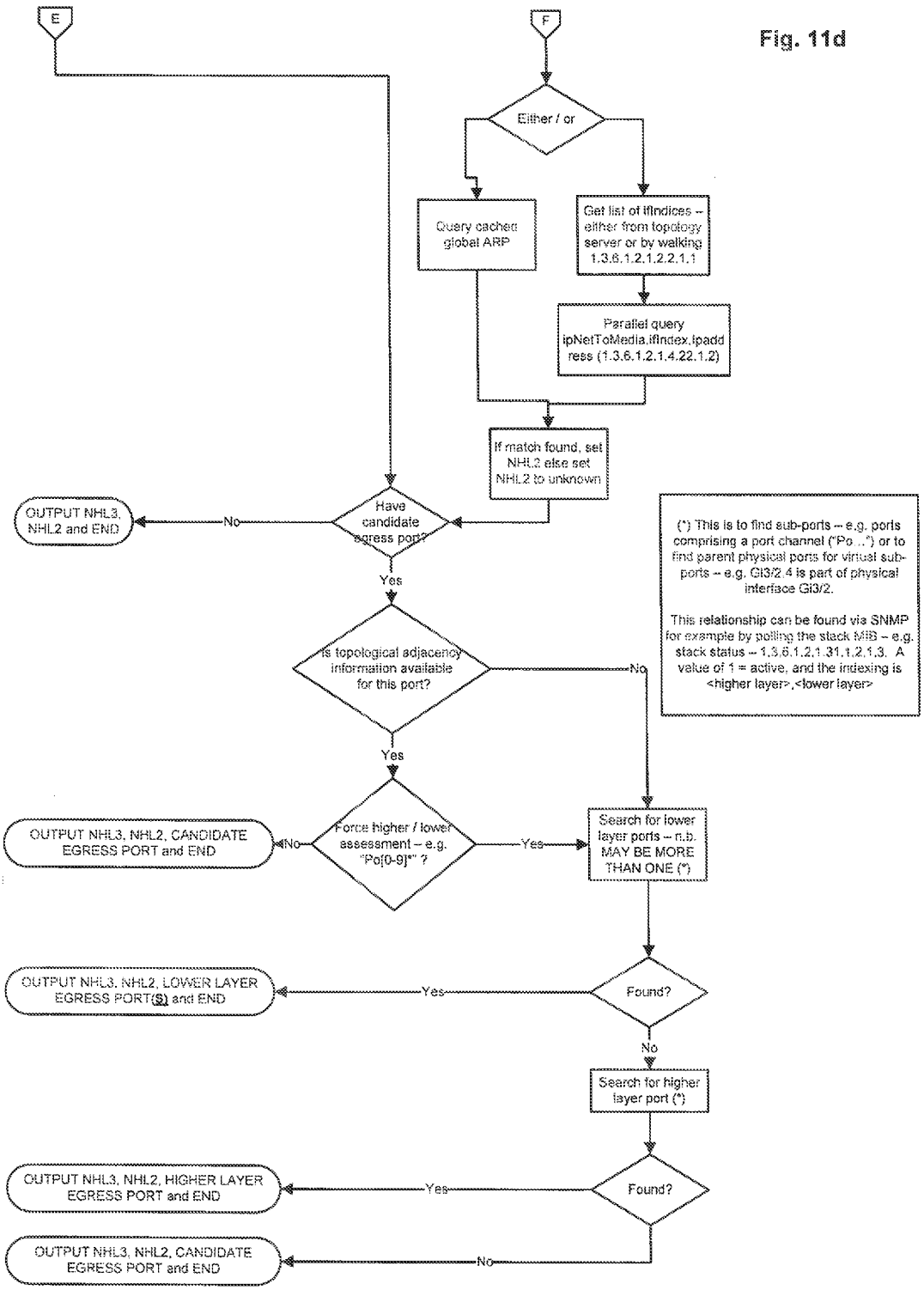

FIG. 10 is a highly schematised version of a layer 2 switch. Similarly to a layer 3 routing device, the layer 2 switch has ports Pi/Po, each connected to a physical link as shown for example, in the network of FIG. 1. As mentioned earlier, ports are not usually dedicated as input or output. Incoming packets at an ingress port Pi are directed to a switch 100 which can access a layer 2 forwarding database (FDB) 102 for determining how to route the packets based on destination identifiers (normally headers) in the packets. A layer 2 forwarding databases maps an incoming packet's identifier to an egress port on which the packet should be forwarded. As already explained above, according to the OSI model the identifiers for the layer 3 routing devices are IP addresses, whereas the identifiers for the layer 2 devices are MAC addresses.

As with the layer 3 devices, layer 2 are known in the art and thus will not be discussed further herein. However, it is noted that again like the layer 3 devices they can receive a query in a packet at an ingress port Pi and generate a response to that query to the output from the layer 2 switch at an egress port Po. Thus the query packets themselves are not routed at the switch but instead generate a response which is returned to the querying device, in this case the monitor computer 16.

A switch controller 101 at the switch is responsible for forwarding traffic and for generating responses.

Some more recent devices can perform the function of layer 3 and layer 2.

Figure 2A:
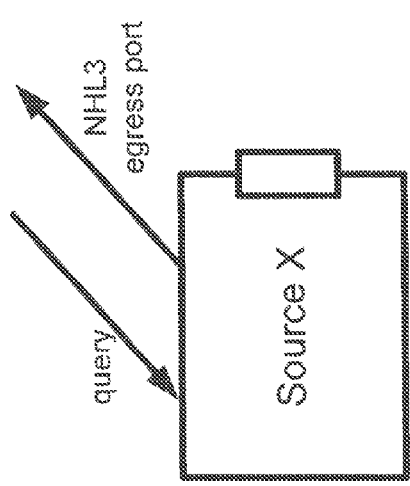
FIGS. 2a to 2c are a diagrammatical illustration of a path discovery algorithm in process.
Figure 2B:
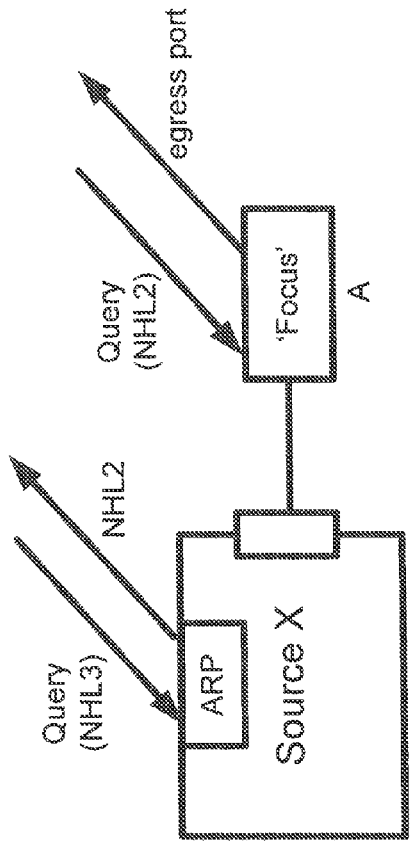
Figure 2C:
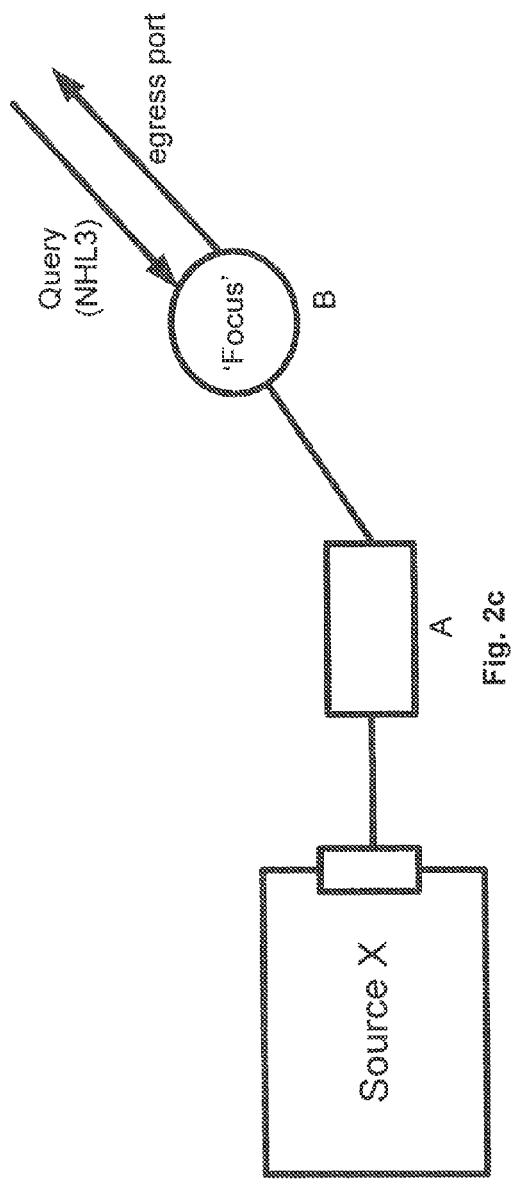

The following described embodiments of the present invention provide a method of identifying a path taken by a message flow between a given source device and a given destination device. For example, endpoint X could be considered a source device and endpoint Y could be considered a destination device. Faced with a network of FIG. 1, it is, as already discussed above, it is a far from trivial task to establish what path will be adopted through the network between those endpoints at any given time and under any given set of environmental conditions. FIG. 1 shows a monitor computer 16 which executes a path discovery program which allows such a path to be discovered and recorded. FIG. 8 is a highly schematic version of a monitor computer 16. The computer 16 comprises a microprocessor 80 which can access memory 82 in which is stored code for execution by the processor. In the present case, the code includes the path discovery program. The memory 82 also stores a path record 81 as it is created by the path discovery program. The computer has a user interface 84 which can include a user input device such a mouse or keyboard and a display for displaying information to a user. In particular, as discussed in more detail herein alerts following the path discovery program or information concerning the path discovery program can be displayed to a user at the user interface 84. FIGS. 2*a* to 2*c* illustrate steps of the path as will now be described.

At a high level the algorithm uses the notion of a "focus device" which is the device currently being queried as to where it would send a hypothetical packet next (i.e. which interface would it send the hypothetical packet out of). Seeded by the source device and the terminal device (i.e. the ultimate destination of the packet) the algorithm adopts successive options in a loop to evaluate each focus device. According to two of the options ("S" and "R") if the device is operating at layer 3, it is queried for which interface (egress port) it would use to send packets bound for the next hop at layer 3 (NHL3); if the device is operating at layer 2, it is queried for which interface (egress port) it would use to send packets bound for the next layer 3 hop's layer 2 (MAC) address (NHL2). Using the focus device's response in conjunction with a network topology, the next device in the path can be determined. In this way the algorithm works along the layer 3 path, using layer 2 devices to navigate between the consecutive layer 3 nodes.

Other options can be implemented in the loop as needed, as described below.

As part of a priming process (defined later), the source device and terminal device are located. This may not be straight forward and techniques for achieving this are discussed later.

According to the prime algorithm, the first hop is located. The path is seeded and the loop count is set to zero. The loop limit governs the number of times a path identification loop (discussed later) is executed.

Figure 12:
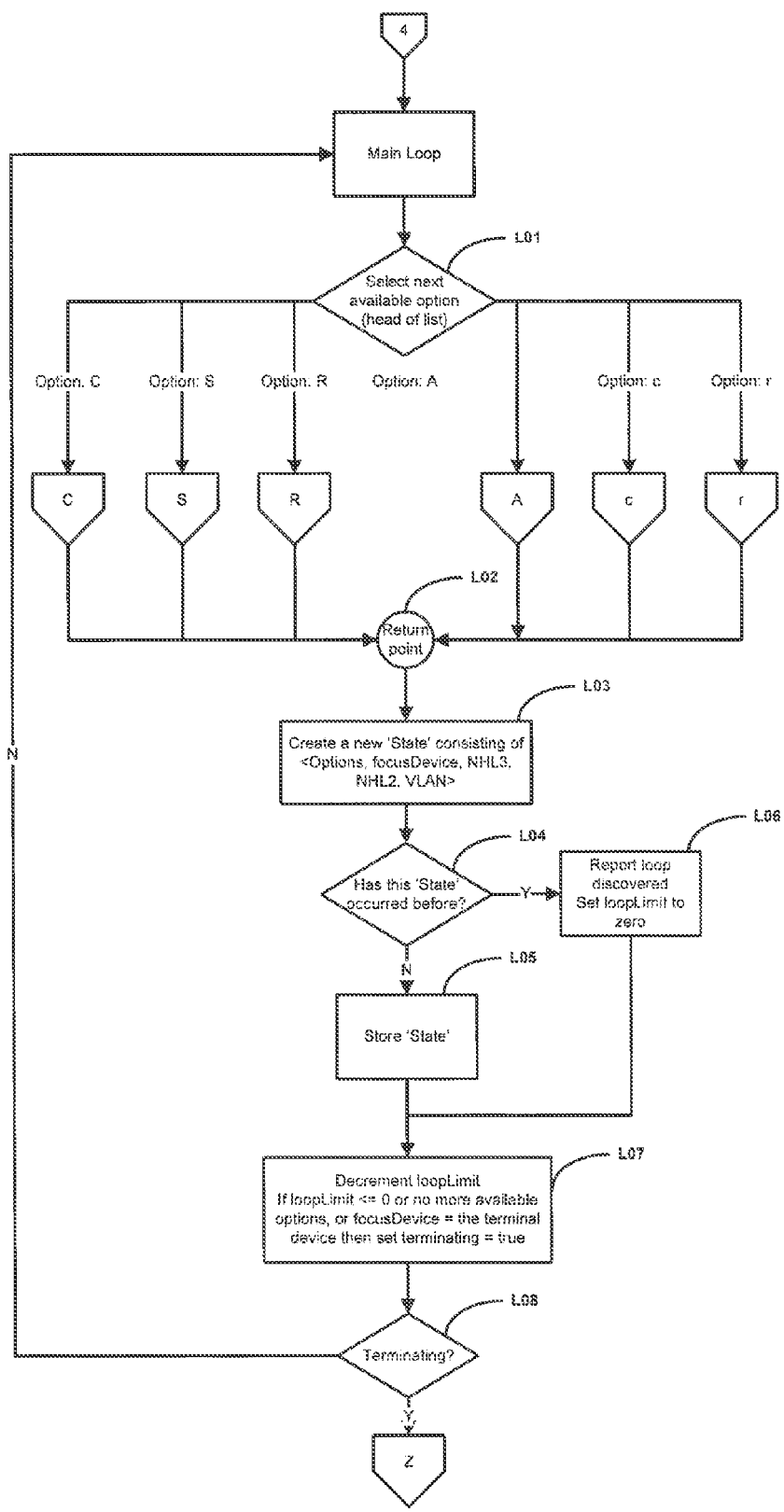
FIG. 12 is a flow chart of a loop execution program.

Reference will now be made to FIG. 12 to describe the loop iteration process. Entry into the main loop is denoted at the top of FIG. 12 by entry arrow 4. Entry arrow 4 denotes the state at the end of the priming processes which will be described later. The entry state comprises:

<Options, focus device, NHL 3, NHL 2, VLAN>

These items will be described in more detail and are set by the priming processes which will be described later. These are referred to in the following as "state variables". The state variable entitled "options" has an ordered sequence of loop options. In the present example, the ordered sequence comprises CSRAcr.

The state variable entitled "VLAN" is the Virtual Local Area Network Identifier (number) for the VLAN with which the hypothetical packet is currently tagged at this point in the path.

At Step L01 of the loop, the first option (head of list) is selected and is executed. These options are discussed later. After execution of the option, the process returns to return point L02 and a new state is created (L03) following the processing steps implemented by the head of list option. It is determined (L04) whether this state has occurred before, and if it has not, the state is stored (L05). If the state has occurred before, a report "loop discovered" is generated and the loop limit is set to zero, which will have the effect of terminating the loop.

At Step L07, the loop limit is decremented. If the loop limit is less than or equal to zero or there are no more available options in the sequence of options, or the focus device equals the terminal device then a condition "terminating equals true" is set. At Step L08, a check on the terminating condition is carried out, and if the terminating condition is true the main loop terminates. Otherwise, it returns to the main loop entry point using the new state which was created at Step L03.

Note that in the execution of each option in a loop iteration, the first step in the execution of the option is to remove that option from the ordered sequence in the options state variable.

At the end of the processing steps of the option, it may be that that option is reset back into the sequence, or it may have been permanently removed, depending on the option and the results of the processing steps.

Note also that in execution of the processing steps of an option, the other state variables (focus device, NHL3, NHL2, VLAN) may be altered individually or in total. The alteration of any state variable results in a new state, which can constitute a new entry state for a next loop iteration.

Figure 13:
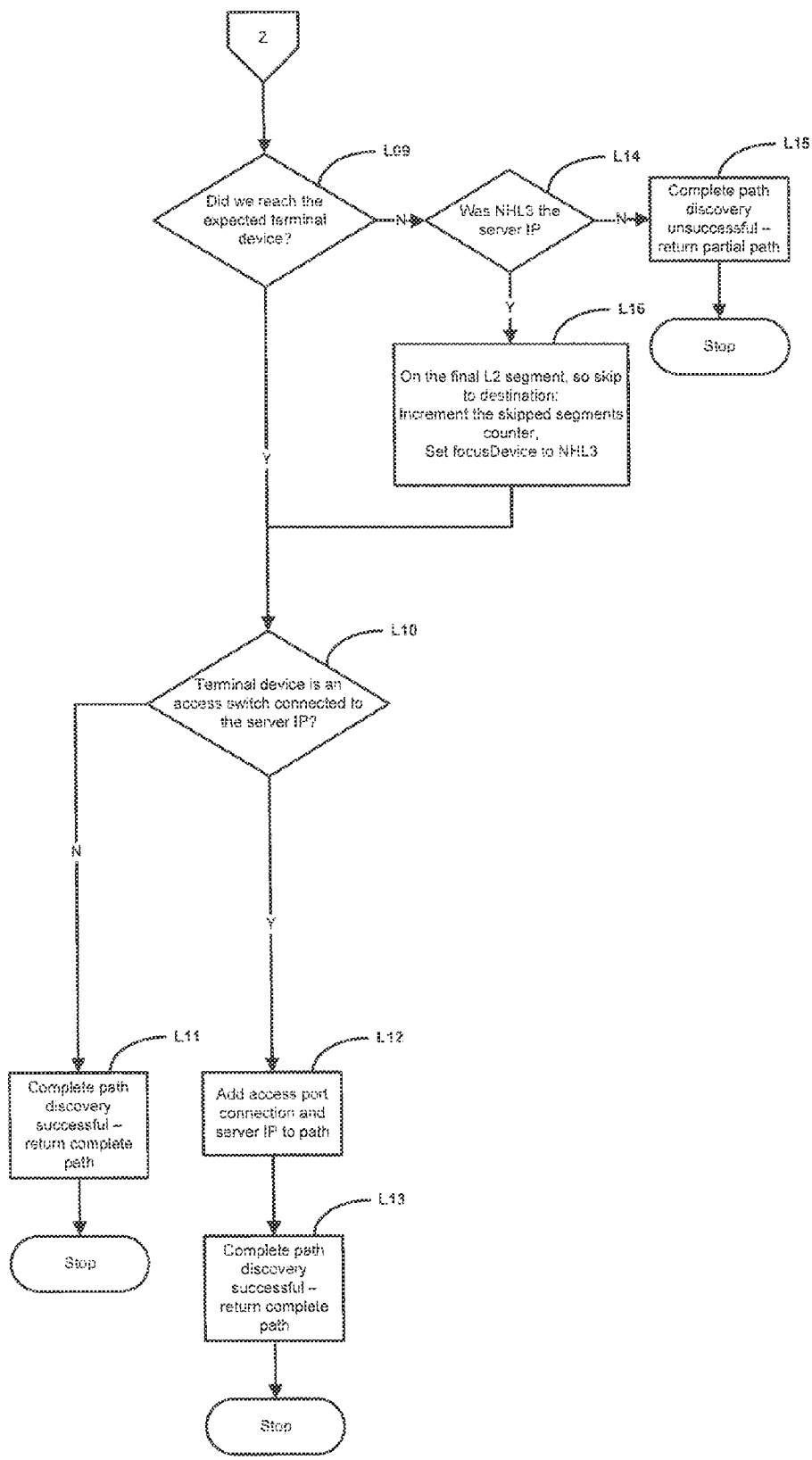
FIG. 13 is a flow chart showing a terminating process of the loop execution program.

Reference will now be made to FIG. 13 to describe the second part of the main loop process. At Step L09 it is determined whether or not the expected terminal device has been reached. If it has, at Step L10 it is determined if the terminal device is an access switch connected to the server IP. If it is not, then the process terminates after indicating a complete path discovery successful and returns a complete path. If the terminal device is an access switch connected to the server IP, the access port connection and server IP is added to the path, and then the process proceeds to complete path discovery successful and returns a complete path before ending at stop.

If at Step L09 it is determined that the expected terminal device has not been reached, then at Step L14, it is asked if NHL3 is the server IP or not. If it is not, then it is determined that the complete path discovery has been unsuccessful, and a partial path is returned before stop. If NHL3 was the server IP, this indicates that the process on the final L2 segment, and so the process can skip to the destination by incrementing the skip segments counter and setting the focus device to NHL3.

Figure 14:
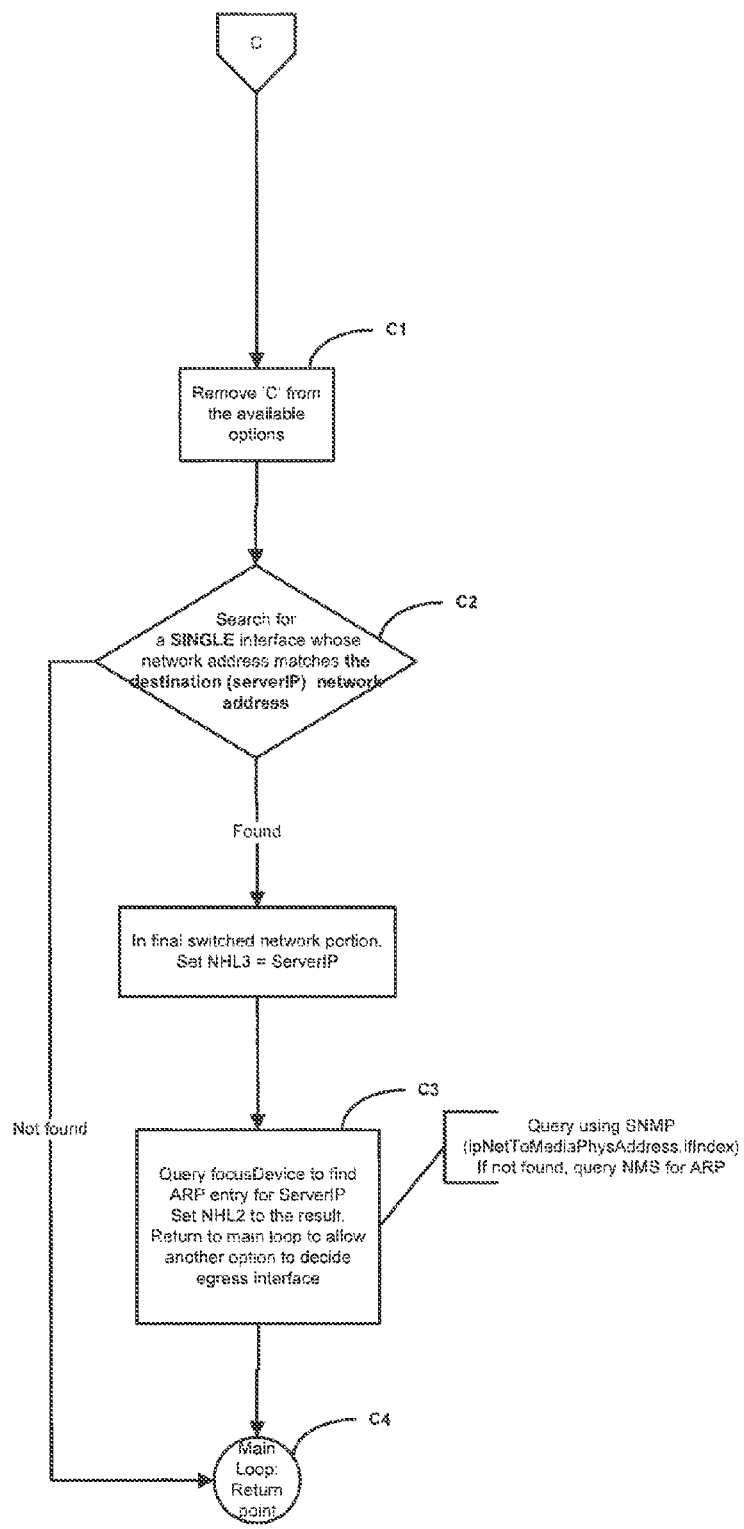
FIG. 14 is a flow chart showing Option C of the loop execution program.

FIG. 14 illustrates Option C. In the first Step C1, the option is removed from the sequence in the options variable. At Step C2, a check is made for a single interface whose network address matches the destination (server IP). If so, this indicates that the algorithm has reached the final switch network portion, and NHL3 is set to the server IP. At Step C3, the focus device is queried to find the ARP entry for server IP, and NHL2 is set to the result. The process then returns to the main loop (C4) to allow another option to decide the egress interface. The query to the focus device is made using SNMP to the ARP table on the focus device, or if not found, the network management system ARP cache is queried. These queries are in accordance with techniques more fully described later.

At step C2, if the check for the single interface for destination server IP fails there is no single interface identified. The state variables are not updated at all. In this case all we have done is evaluated (and discarded) option "C" and found it to be unproductive.

Figure 15:
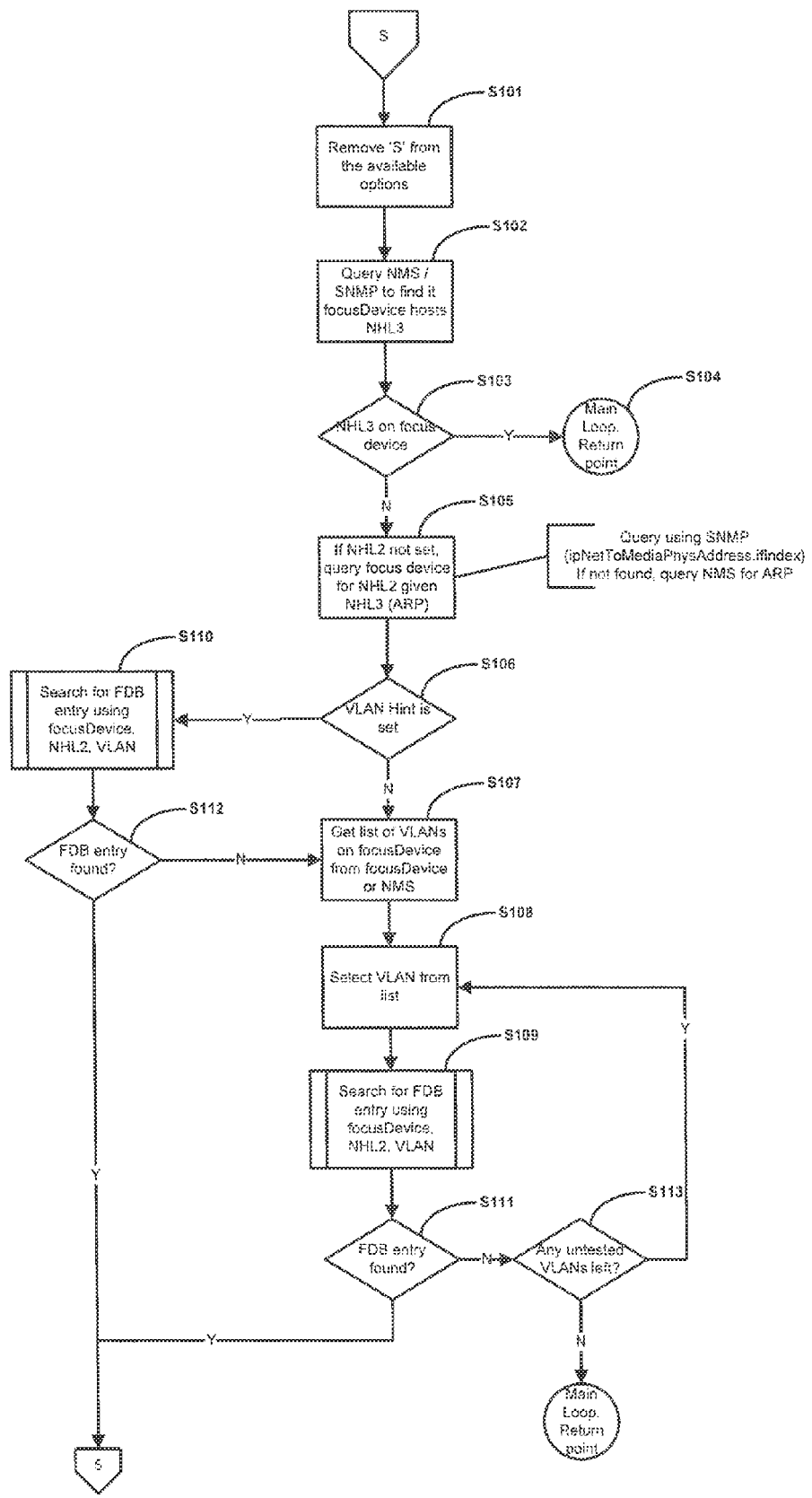
FIG. 15 is a flow chart showing Option S of the loop execution program
Figure 16:
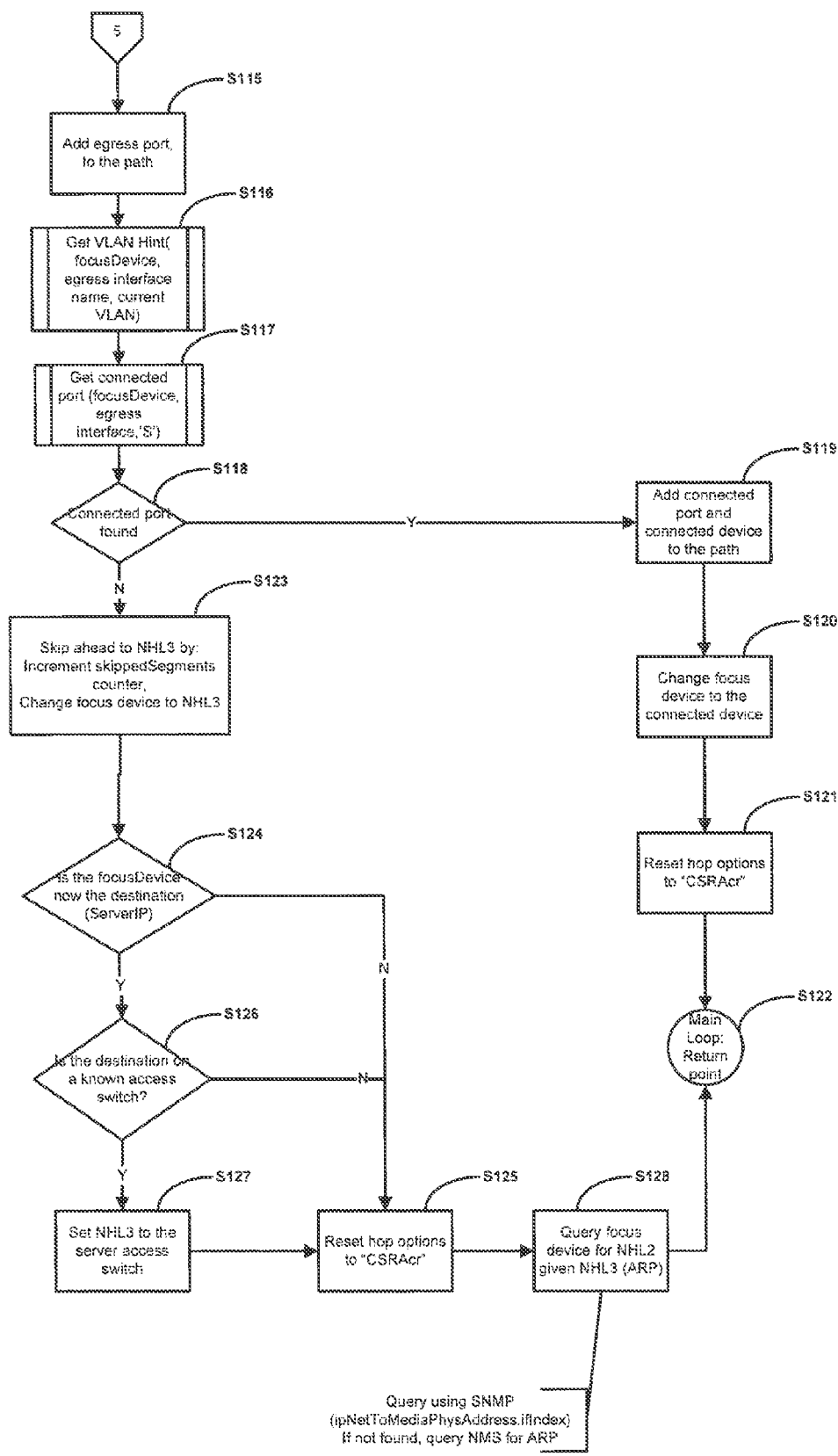
FIG. 16 is a flow chart showing continuation of the process in Option S.
Figure 21:
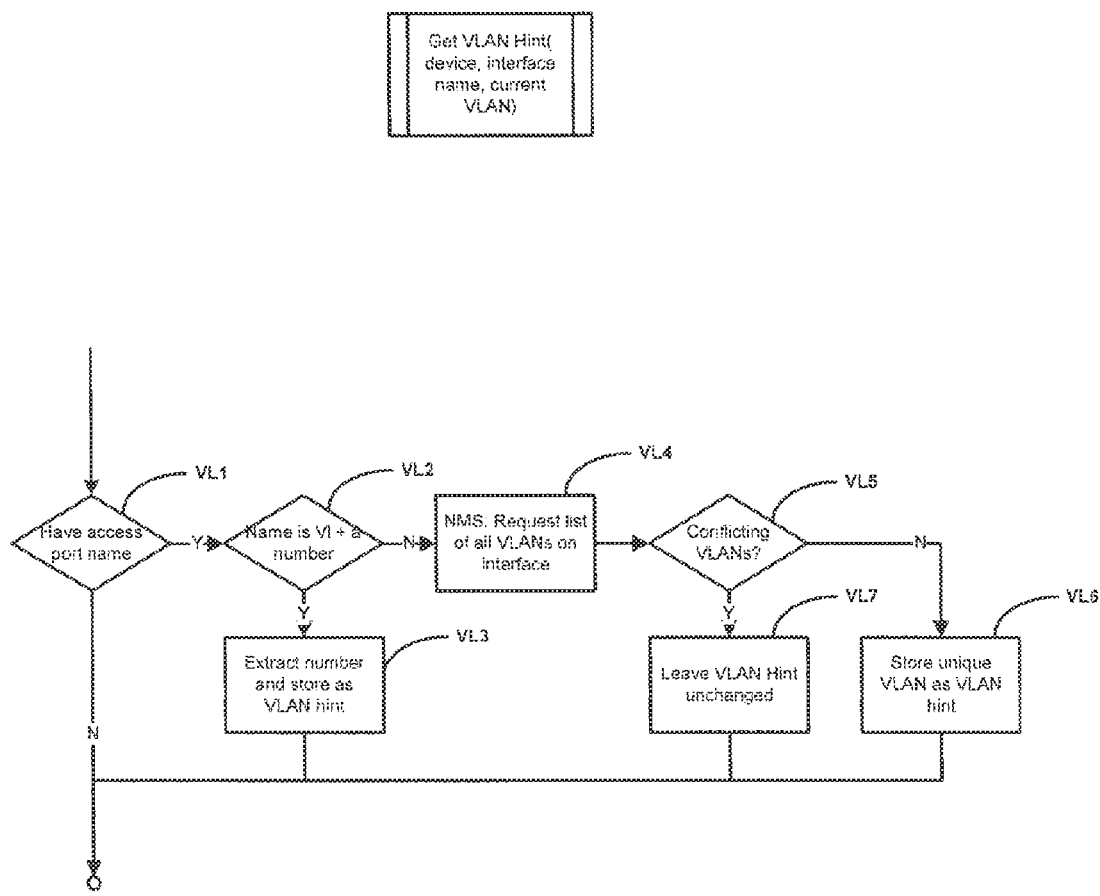
FIG. 21 illustrates a process for obtaining a VLAN hint.

FIG. 15 illustrates Option S. According to Step S101, Option S is removed from the ordered sequence. At Step S102, a query is made to the network management system or using SNMP queries to the focus device to find if the focus device hosts NHL3. If NHL3 is on the focus device, the process returns to the main loop return point (S104). If the routing address NHL3 is not on the focus device, it is determined if the switching address NHL2 is set, and the focus device is queried at the mapping table (ARP) for NHL2 given NHL3. The queries are made as described more fully later. At Step S106 it is determined whether or not the VLAN hint is set. VLAN hints will be discussed later. If not, a list of VLANs on the focus device is determined either from the focus device or from the network management system. A VLAN is selected from the list and a search for the forwarding database entry is conducted using focus device, NHL2 and VLAN. The search for the forwarding database entry illustrated at Step S109 is shown in a flowchart in Figure X. Returning to Step S106, if the VLAN hint is set then the process goes directly to Step 110, which is a search for FDB entry as in Step S109 using the VLAN hint as the queried VLAN within the FDB. At Step S112 (also S111), it is determined whether or not there is an entry found in the forwarding database. If there is, the process proceeds to the second part of Option S which is shown in FIG. 16 (entry arrow 5). If following Step S111, no FDB entry is found, a VLAN loop is entered until it is determined whether there is an FDB entry or that the process should return to the main loop. The entry point to the second part of Option S is shown at arrow 5 at the bottom of FIG. 15. This is also shown at the top of FIG. 16. As described, earlier, if a forwarding database entry is found this indicates the egress port for the path S115. This can be used to get the next connected device from the network topology, as shown in Step S117, and described more fully later. Step S116 is the step of getting a VLAN hint which is shown in FIG. 21 and will be discussed later.

Figure 22:
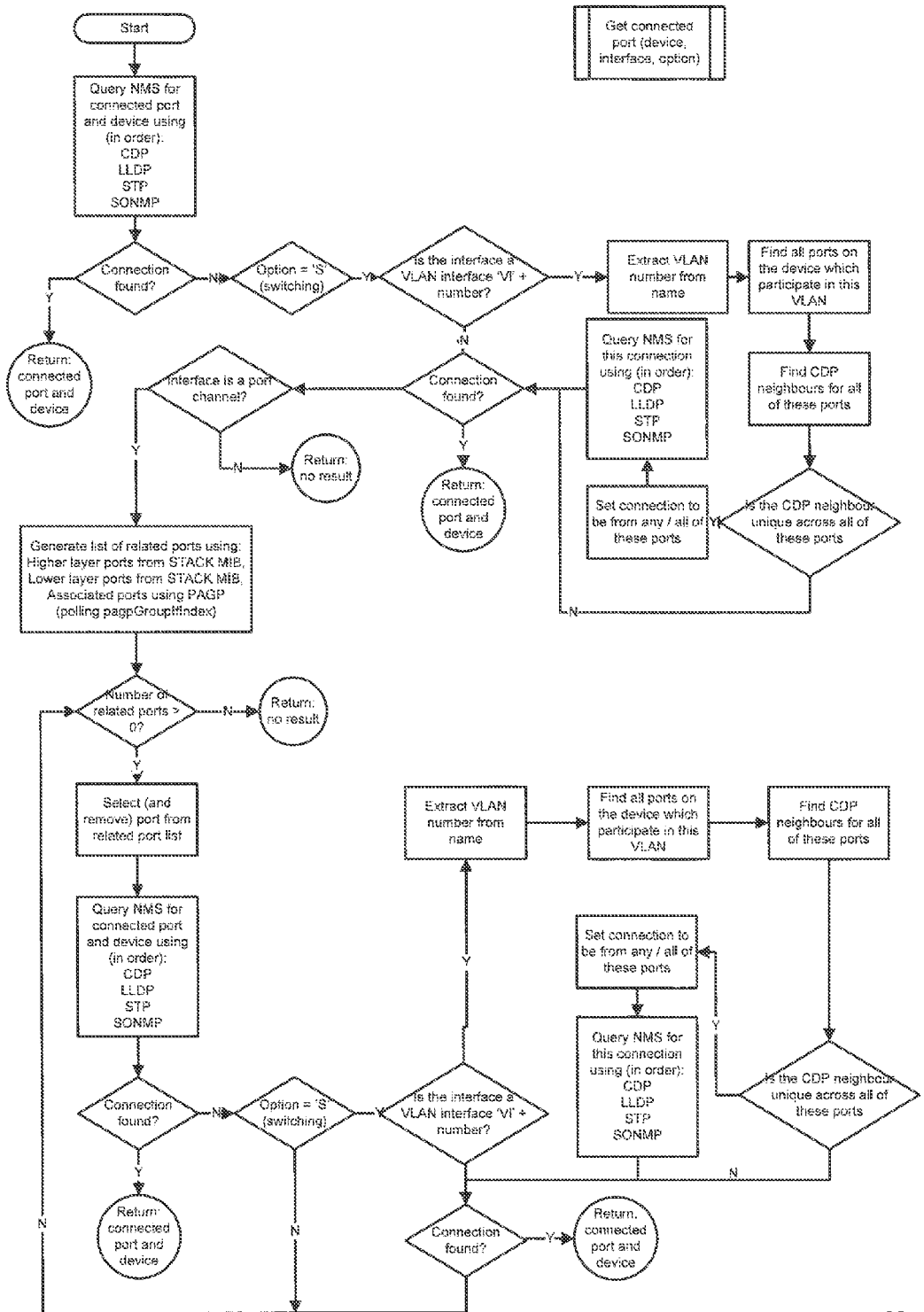
FIG. 22 is a process for obtaining a connected port and connected device to store in a path record.

Step S117 is shown in FIG. 22, which is a flowchart illustrating the process for obtaining the connected port and therefore the subsequent connected device from the network management system based on the egress port returned from the forwarding database: If at Step S118 the connected port is found, the connected port and connected device are added to the identified path (Step S119) and at Step S120 the focus device is changed to the connected device. At Step S121, the loop options are reset to CSRAcr. Then the processor returns to the main loop at Step S122. Returning to Step S118, if the connected port is not found, the process skips ahead to NHL3 by incrementing a skip segment counter 89 (FIG. 8) and changing the focus device to NHL3. The skip segment counter is implemented at the management computer in hardware, firmware or software and allows segments of the path to be noted as being skipped where it is clear that the next connected device cannot be readily ascertained from the preceding process steps. At Step S124 it is determined if the focus device is not the destination (server IP). If not, the loop options are reset to CSRAcr at Step S125. If the focus device is the destination server, at Step 126 it is determined whether the destination is on a known access switch, and if so, NHL 3 is set to the server access switch address. After setting the loop options at Step S125, at Step S128 the focus device is queried for NHL2 using the NHL3 address which was set in Step S127, by querying the focus device's ARP table or an NMS.

Note that Option S includes the step of removing it from the available options at Step S101, and then resetting it back into the available options in Steps S121 and Step S125 based on the outcomes of the processing steps.

Figure 17:
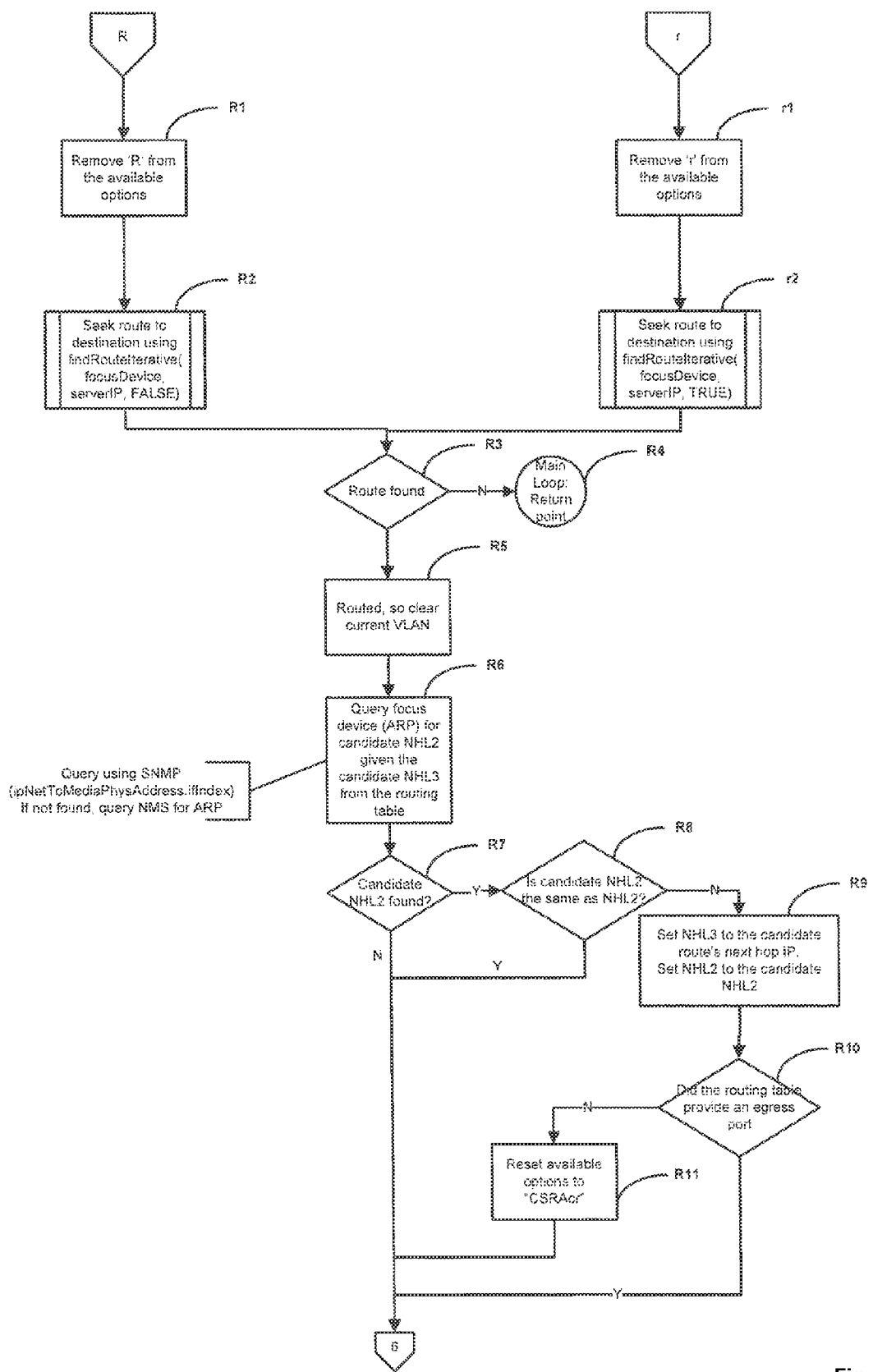
FIG. 17 is a flow chart showing the process in Option of the loop execution program.
Figure 18:
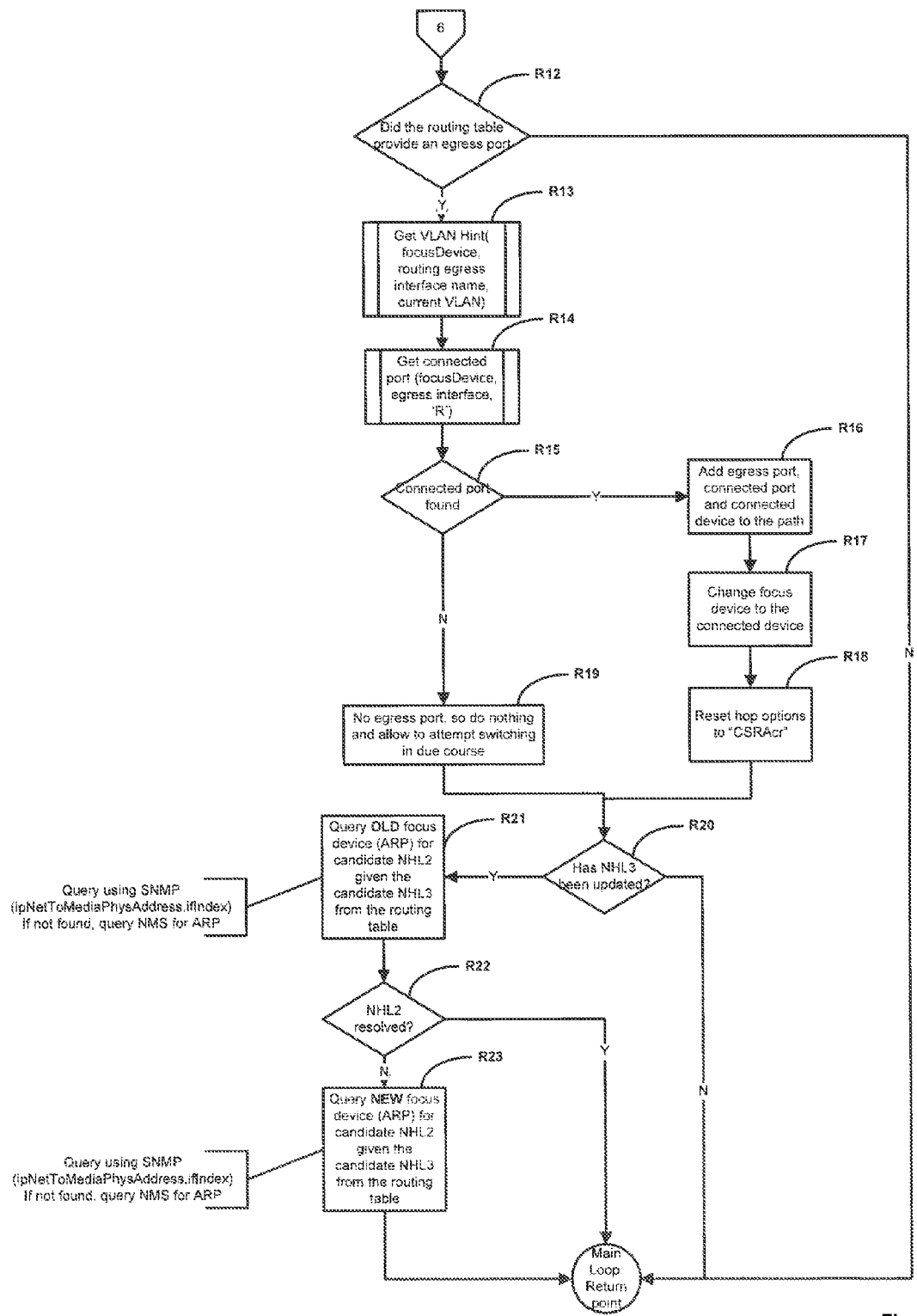
FIG. 18 is a flow chart showing a continuation of the process of FIG. 17.

Reference will now be made to FIG. 17 to describe Options R and r. Each of those options begins with the removal of that option from the ordered sequence in the option variable Step R1, r1. At Step R2, r2, a process is instigated to seek the route to the destination IP (server IP) using an iterative route finding process which is illustrated in Figure P. In Option R, the process operates where there is no default route allowed (default route allowed equals false). In Option r, the process allows a default route (default route allowed equals true). If no route is found, Step R3, the processor returns to the main loop. If a route is found, then a query is despatched to the focus device using a candidate NHL3 which has been determined from the routing table from which the route was found. This query is to the device's ARP table to determine a candidate NHL2 which corresponds to the candidate NHL3. If no candidate NHL2 is found, the process moves to entry point 6 for the second part of Option R/r. If a candidate NHL2 is found from the ARP query, then a check is performed at Step R8 to determine if the candidate NHL2 is the same as the NHL2 which is recorded as the state variable in the entry state to the process R/r. If they are the same, then the process proceeds to entry point 6. If they are not, following Step R8, if the candidate NHL2 is not the same as the entry state NHL2, then NHL3 is set to the candidate route's next hop IP, and NHL2 is set to the candidate NHL2. At Step R10 it is determined if the routing table queries in R2 and r2 also provided an egress port. If yes, the process proceeds to entry point 6. If not, the options are reset to CSRAcr at Step R11. FIG. 18 illustrates entry point 6 at the top of the Figure. At the next Step R12, it is determined if the routing table provides an egress port. If not, the process returns to the main loop. At Step R13, the get VLAN hint process is conducted according to FIG. 21 and to be described later.

Then the get connected port process is conducted as illustrated in FIG. 22. At Step R15, it is determined if the connected port is found or not. If it is, the egress port, the connected port, and the connected device are added to the path. The focus device is changed to the connected device and the loop options are reset to CSRAcr. If no connected port is found, nothing is done at this stage. The process proceeds to step R20 where it is determined if NHL3 has been updated. If it has not, the process returns to the main loop. If it has, the old focus device is queried for the candidate NHL2, given the candidate NHL3 from the routing table. If, following that step, the NHL2 has been resolved, the process returns the main loop. If it has not, the new focus device is queried for the candidate NHL 2 given the candidate NHL3.

Figure 19:
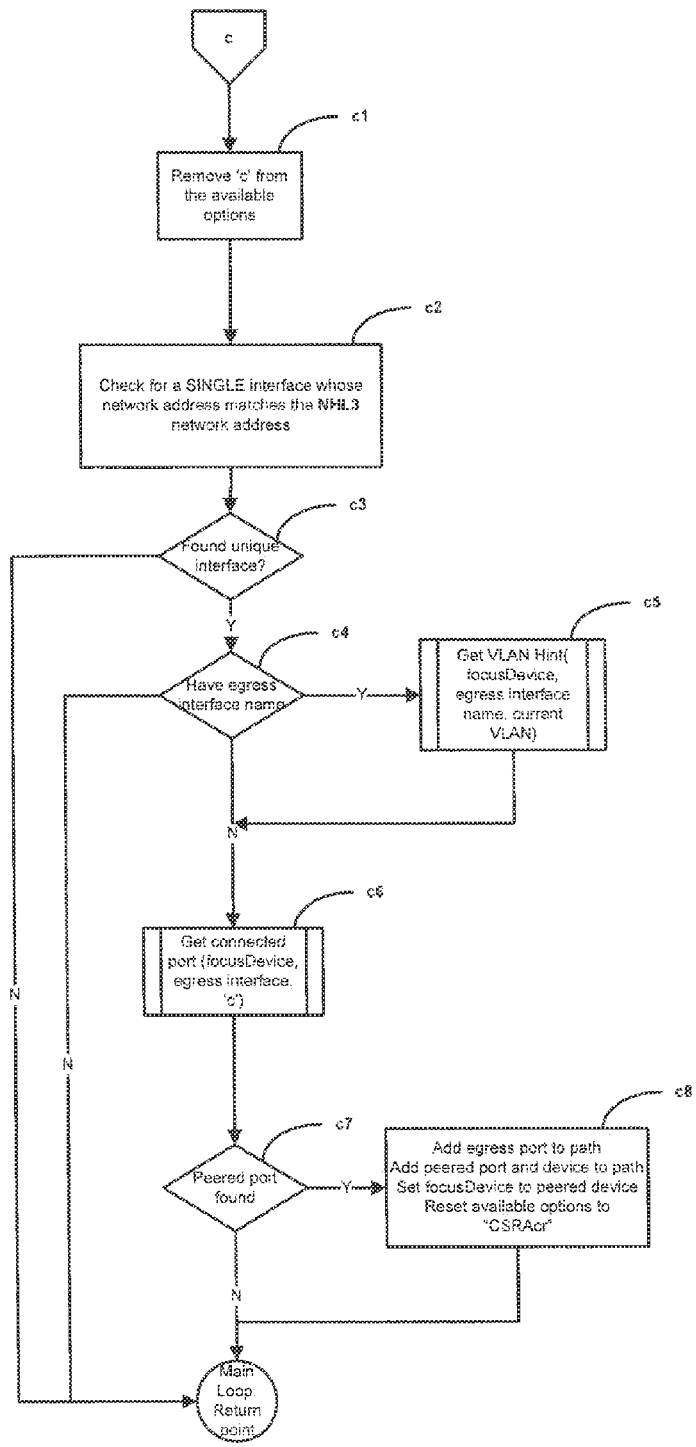
FIG. 19 is a flow chart showing the process of Option c of the loop execution program.

Reference will be made to option c referring to FIG. 19. At the first Step c1, c is removed from the options in the state variable. At Step c2 a check is carried out for a single interface whose network address matches the NHL3 network address. If a unique interface is not found, the process returns to the main loop. If a unique interface is found, and there is an egress interface name, the VLAN hint process which will be described with reference to FIG. 21 is carried out. Following step c4 the connected port is obtained using the get connected port process shown in FIG. 22.

At Step c7, it is determined if a peered port is found. If it is, the egress port, the peered port and the peered device are added to the path and the focus device is set to the peered device. The available options are reset to CSRAcr at c8. If no peered port is found at Step c7, the process returns to the main loop.

Figure 20:
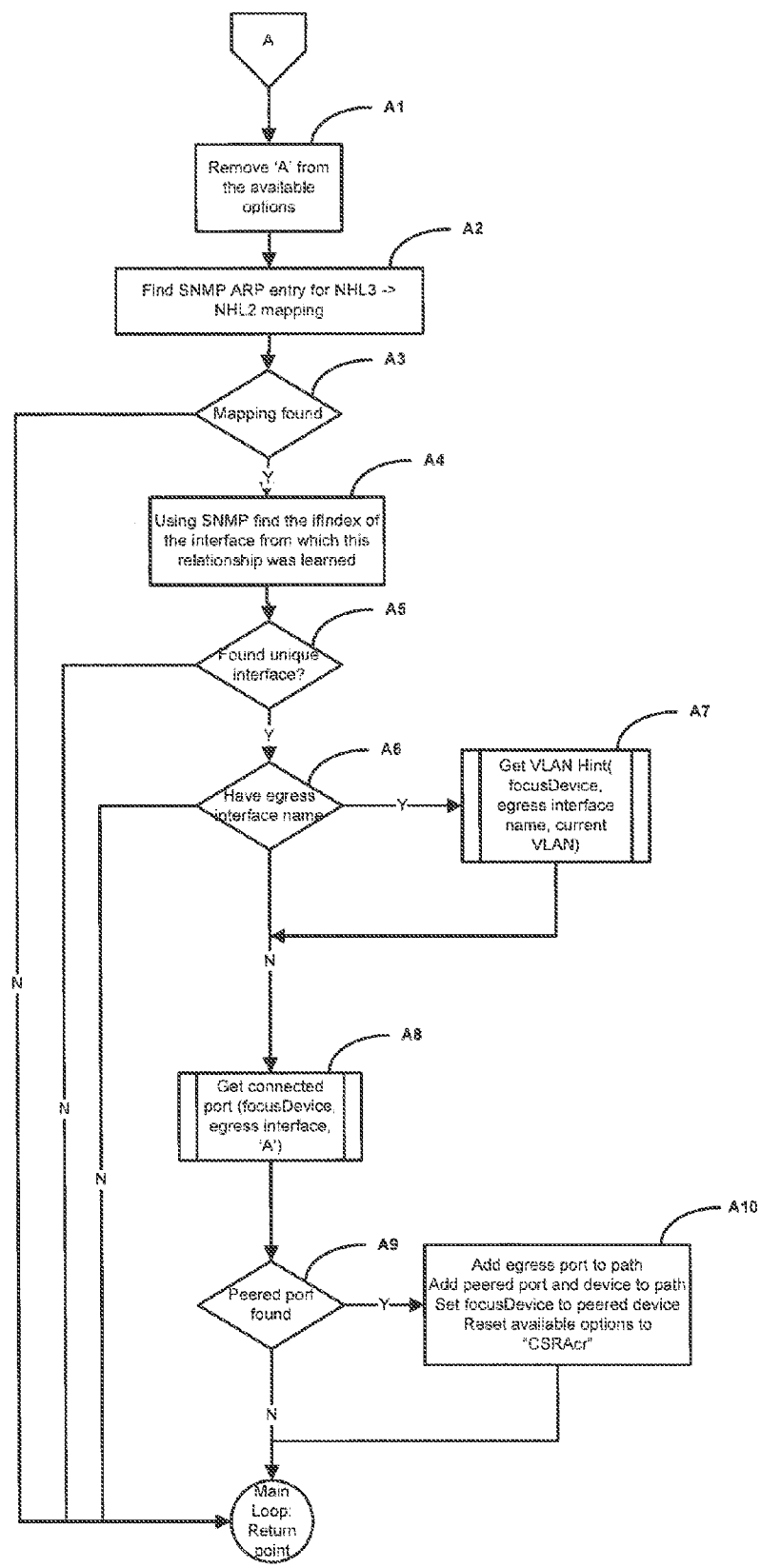
FIG. 20 is a flow chart showing the process of option A.

Reference will now be made to FIG. 20 to describe Option A. At Step A1, Option A is removed from the option sequence in the state variable. At Step A2, the SNMP ARP entry for NHL3 to NHL2 mapping is found. If no mapping is found, the process returns to the main loop.

If a mapping is found, the process uses SNMP to find the ifIndex of the interface from which the relationship was learned. At Step A5, it is determined whether or not a unique interface has been found. If it has not, the process returns to the main loop. If it has, the process proceeds to Step A6 where it is determined if there is an egress interface name available. If there is, the VLAN hint process is instigated as will be described with reference to FIG. 21. Then at A8 the get connected port process is instigated as illustrated in FIG. 22.

If as a result of the get connected port process a peered port is found, the egress port is added to the path, the peered port and peered device are added to the path and the focus device is set to the peered device. In addition, the available options are reset to CSRAcr. If no peered port is found, the process returns to the main loop.

Reference will now be made to FIG. 21 to explain the VLAN hint process. This process was used in Option A at Step A7, Option c at Step c5, Option R/r at Step R13 and Option S at Step S116. In addition, it is used in one of the priming processes which has not yet been discussed. The process starts at Step VL1 with an access port name. At Step VL2 it is determined if the name is in the form "VL+a number", and if it is the number is extracted and stored as a VLAN hint at Step VL3.

If it is not, then at the network management system a list of all VLANs on the interface is requested. Step VL5 checks for any conflicting VLANs. If there are none, then the unique VLAN is stored as a VLAN hint at Step VL6. If there are conflicting VLANs, any VLAN hint which has already been stored is left unchanged.

VLAN hints address an issue that can arise in certain networks which use a switching technique called STP (Spanning Tree Protocol) which is used to prevent having logical loops in switched (layer 2) portions of the network (to avoid the traffic looping around infinitely). The protocol is used to decide where a switching device should forward a given packet to.

That is, if the device is switching, the switch will look at the layer 2 (MAC/Ethernet) header and look at the destination layer 2 address (NHL2) and then consult an internal database (the FDB—Forwarding Data Base) to ascertain which of its ports it should send the packet out from. Many enterprises use an extension to STP called PVSTP (Per VLAN Spanning Tree Protocol) whereby each packet is marked with a VLAN identifier too. The switch then maintains separate FDBs—one per VLAN.

This is partly done for efficiency and partly to allow more complex virtual topologies. So, it is perfectly possible (and not uncommon) for two packets with the same layer 2 destination to leave by different ports as they are tagged as being in different VLANs even though their destination is the same device/port.

The consequence of this is that the process cannot simply trawl all of the per-VLAN FDBs until a match is found. It is important to know a priori which VLAN the packet is tagged as being a member of.

This VLAN tagging can occur in different places in the network, e.g. at the source access port—i.e. where the source device is physically connected, or somewhere else in the network—it is not uncommon for one VLAN tag to be replaced by another (this is called inter-VLAN routing).

For example, given a packet arriving at network device D (in the path A→B→C→D) D can only be queried for the correct egress interface if the VLAN the packet from A would be in at the point when it reaches D is known. It could be, for example, that A places the packet in VLAN 100, B passes it (using VLAN 100), then C changes 100 to 200 and then D switches it using VLAN 200.

This is why it is necessary to 'carry' a VLAN hint across the network from our source device to our destination device as part of the hypothetical packet we track. So, where applicable the VLAN hint is used, annulled, reset or updated.

Figure 23:
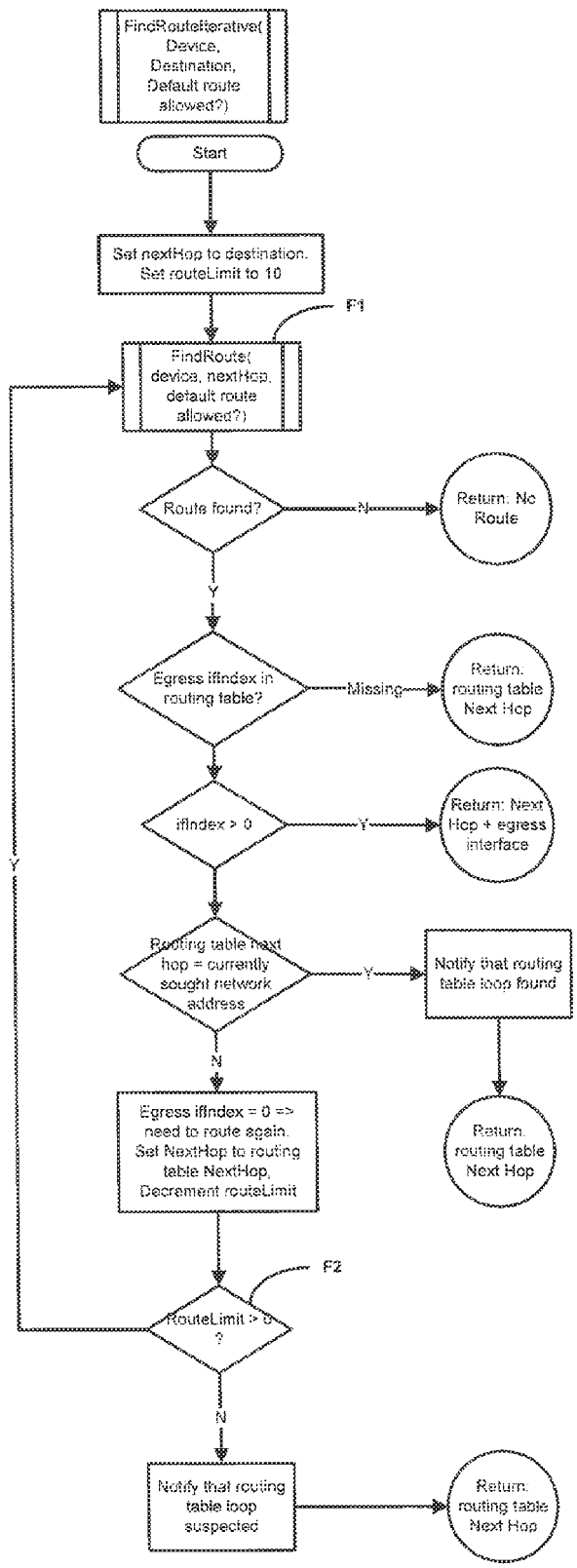
FIG. 23 is a flow chart showing an iterative process for finding a route which is utilised in some of the preceding options.

As mentioned already, FIG. 23 illustrates the findRouteIterative process which is used in Options R and r. The process involves a find route loop which begins at Step F1 and terminates at a route limit check F2. The process findRouteIterative then determines if a route has been found and allows for an egress index to be located pertaining to the route.

Figure 24:
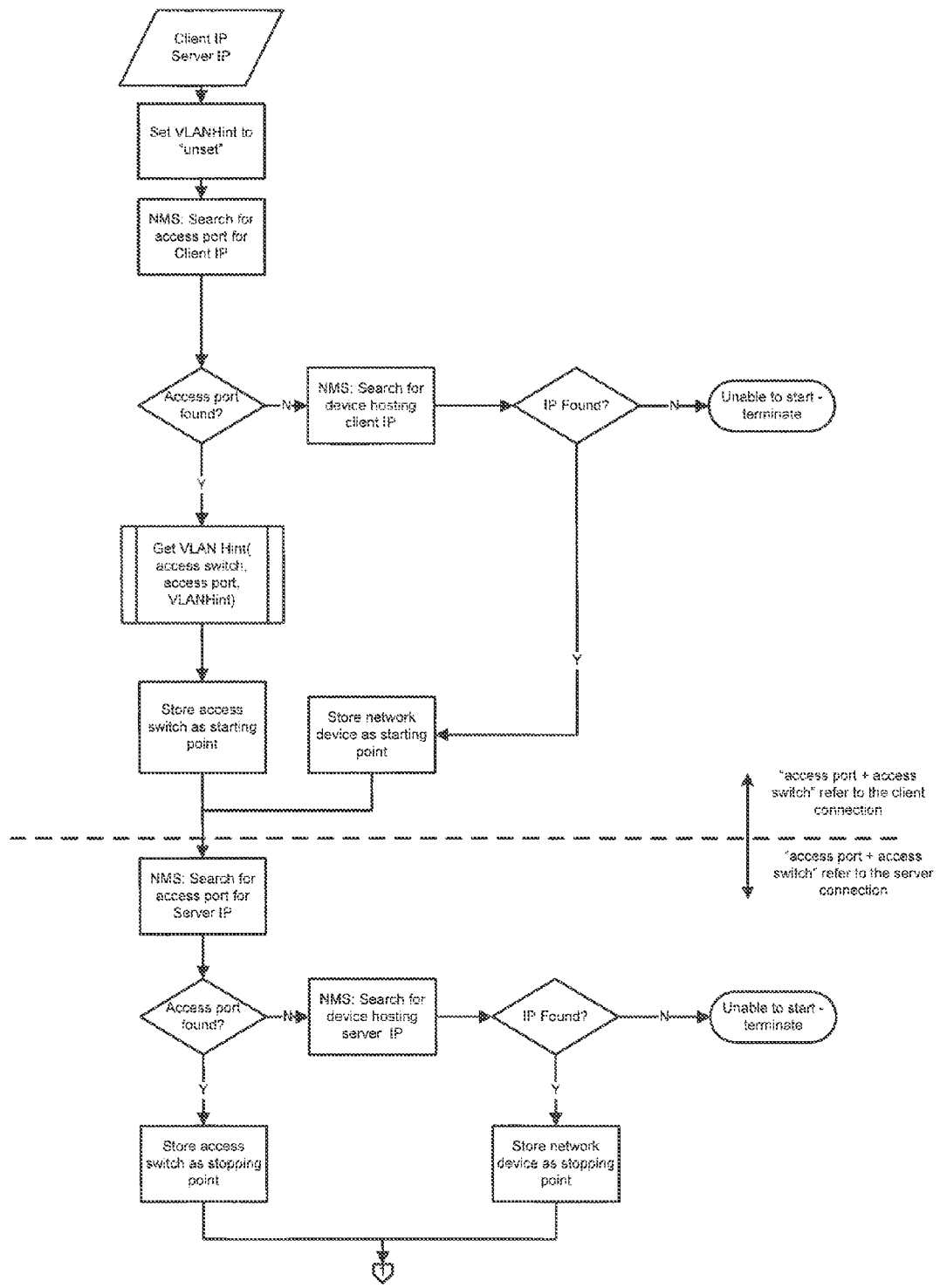
FIGS. 24, 25 and 26 illustrate three priming processes.

Before embarking on the main loop, there are three priming processes which are implemented in order to set the entry state for the first iteration of the loop. A first priming process is shown in FIG. 24, which sets as a starting point the access switch or network device identified for the source device (referred to in FIG. 24 as the client side. Similarly, an access switch or network device is stored as a stopping point, based on the destination device, referred to in FIG. 24 as the server side. In FIG. 24, the client IP and server IP are the source and destination addresses respectively.

Figure 25:
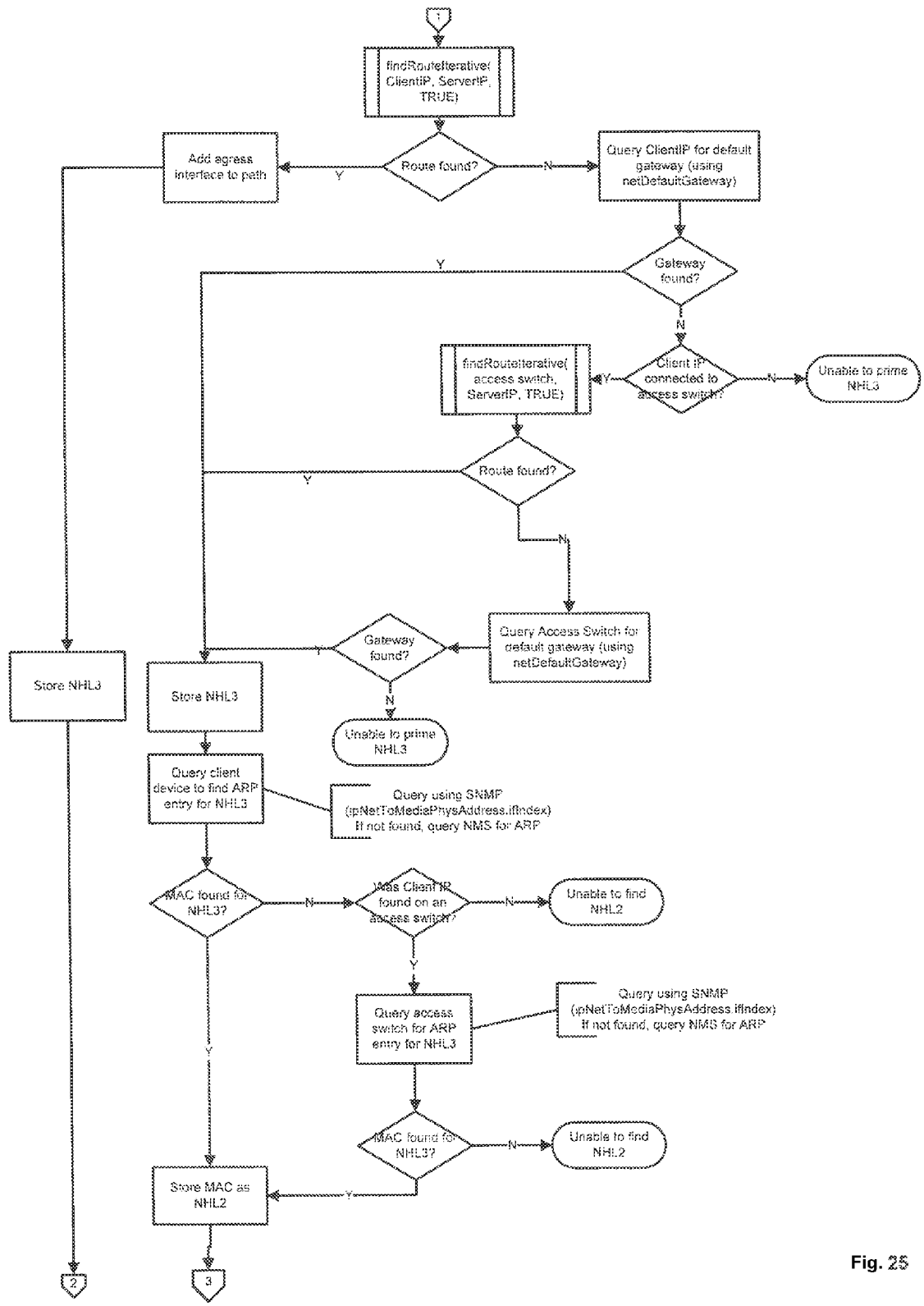

FIG. 25 is a priming process for setting up the initial entry state NHL3 and NHL2 addresses.

Figure 26:
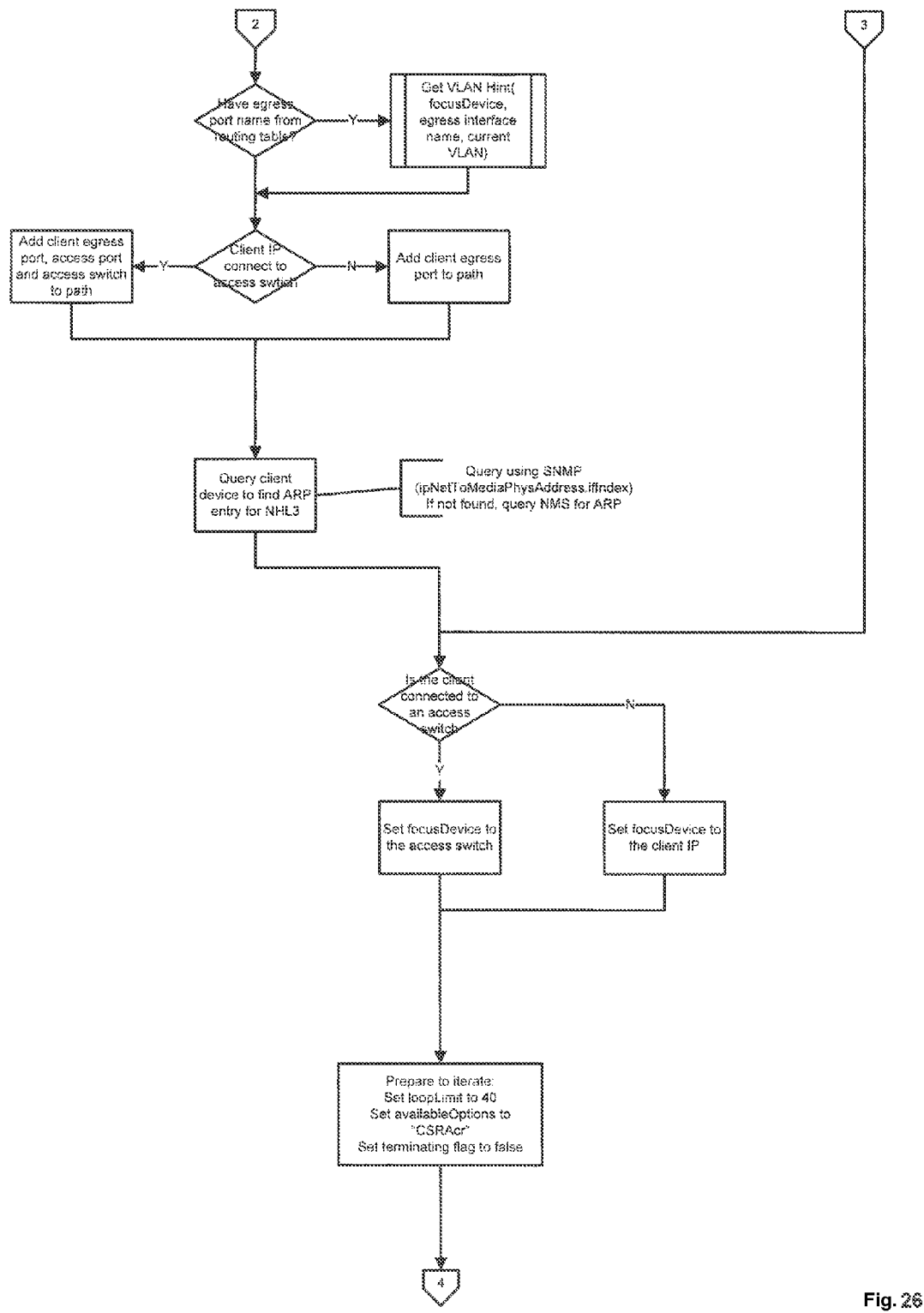

FIG. 26 illustrates a third priming process which sets the focus device for the initial entry state.

Note that the first priming process of FIG. 24 leads to the second priming process of FIG. 25, and the second priming process of FIG. 25 leads to the third priming process of FIG. 26. The third priming process leads into the main entry point 4 of the main loop shown in Figure A.

An alternative algorithm for identifying a path is now discussed. It will be apparent that detailed explanations in parts of the following description apply to the equivalent parts of the loop iteration process just described.

Find First Hop at Layer 3

The first hop is located by finding the initial next hop (the next hop from the source device) at layer 3 (NHL3). In the following explanation, the term "query" is frequently utilised. Queries are generated and structured as described in more detail later. The purpose of a query is to locate a next hop address and egress port from a focus device to which the query is addressed. The initial NHL3 address can be determined by firstly querying a source device X using the destination IP address. That is, an attempt is made to query the routing table on the source device for NHL3 and the egress port. If no route is found, and the source device has a layer 3 access switch, this Layer 3 access switch is queried for NHL3 using the destination IP address. If that is not successful, the default gateway on the source device is queried to ascertain the NHL3. If that is not successful a query is made using the destination IP address to the access switch for the default gateway. If no NHL3 address is found, this is considered as a fail. This does not mean that the algorithm has failed, but that a fail point in the path may have been identified at this point. Alternatively, there may be other reasons why no NHL3 has been found.

Seed the Path

To seed the path, the source device is added to the path when it has been located. The egress interface of the source device is located and added to the path. If NHL3 is found from the routing table on the source device the source device egress interface for this NHL3 address is added to the path. As explained later, the layer 2 address (NHL2) corresponding to the layer 3 address (NHL3) can be ascertained. If no egress port for NHL3 is found from the routing table on the source device, the layer 2 forwarding table on the source device for NHL2 is used to find the egress port. If that is found, then that egress port is added to the path.

Path Discovery Algorithm

Figure 3:
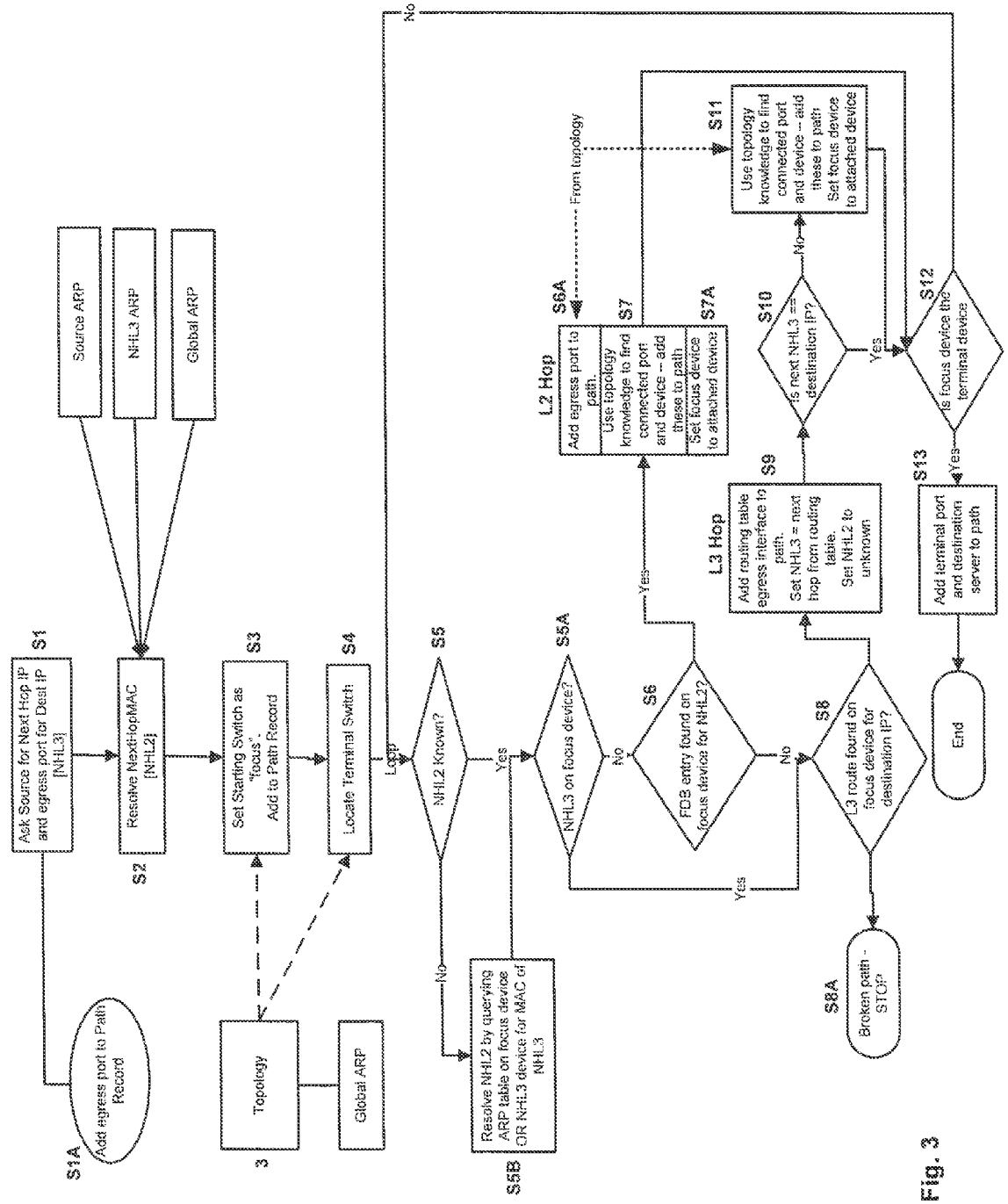
FIG. 3 is a flow chart for a path discovery algorithm.

The query dispatched from the monitor computer 16 to the source device X is shown as a direct arrow in FIG. 2a, but in fact, could be implemented in the network of FIG. 1 by the monitor computer 16 issuing a message or packet addressed to the source device X. The query asks the source device for the next hop IP (and egress port) for the terminal IP (destination IP), which is the layer 3 address of the destination point Y. The aim is to cause the source device X to supply a response which includes NHL3 and the egress port for NHL3 (the terminal IP address). See step S1 of FIG. 3 and FIG. 2a.

As explained above, there may be situations when the source device cannot supply the necessary information. Other possibilities mentioned above for obtaining the first "focus" device include querying the connected access switch for layer 3 routing information (in case the access switch is a layer 3 switch), if this fails the algorithm queries the connected access switch for a default gateway and the IP address of the default gateway used as the first NHL3.

At step S2, the next hop layer 2 (MAC) address is resolved from the NHL3 address and NHL2 is set to this MAC address. This can be achieved by querying a mapping table 91 which maps L3 to L2 addresses. One such mapping table is an ARP table (others include "direct mapping" and Neighbour Discovery). This can be the source device ARP, next L3 hop device ARP or global cached ARP using an ARP query described later. The egress port identified in step S1 is added to the path record S1A. At step S3, the starting network switch (and port) is found using cached end host location (from switch CAM queries), and set as the focus device. At step S4, the terminal network switch is found using the cached end host location (from switch CAM queries). The starting switch is added to the path record.

The method is now ready to enter a path identification loop. At step S5 it is determined whether NHL2 is known. If it is, the loop moves to step S5A. If it is not, the process carries out step S5B to resolve NHL2 by an ARP query on the focus device or the NHL3 device. Generation of a query to correlate a layer 3 address with a layer 2 address is discussed in more detail later with reference to FIG. 7. In brief, for the device being queried, a list of interface indices (ifindices) is obtained from the network topology or by walking ifIndex from the interface table of device itself. Each ifIndex for the device is combined with the NHL 3 address to generate a set of keys for including in the query to the device. Thus, a query containing these keys is formulated and transmitted to the focus device. The focus device produces either zero or one successful response.

If the previous two techniques for resolving NHL2 fail, global ARP is accessed. At step S5A, it is determined whether or not the address NHL3 is on the current focus device.

If NHL3 is not on the current device, at step S6, the process dispatches a query to find the layer 2 FDB entry for NHL2 to get the egress port. Generation of a query at layer 2 is discussed later. If it is successful, the egress port is added to the path record (S6A), the cached topology 3 is used to find the port and the device on the end of the link (S7), the device is added to the path (S7A), and the focus device is set to the device which has just been located at the end of the link (L2 HOP). Steps S6A, S7 and S7A can be referred to as an L2 HOP. At this point, refer to FIG. 2b. At step S5A, the focus device is device A. This receives a query to find the layer 2 FDB entry and returns the egress port. The device which is determined to be at the end of that link is device B (FIG. 2c) which receives a query with NHL3 still set to the destination IP address.

If a layer 2 FDB entry was not found, or if at S5A it was determined that the NHL3 was hosted on the focus device, at step S8, a route query is performed to determine if the L3 route is found on the focus device to the destination IP address. The route query can be a single route or recursive route query—these are discussed later. This establishes a next hop IP and an egress interface. If the L3 route is not found, a broken path is indicated and the process stops—S8A. At step S9 (L3 HOP) the routing table egress interface is added to the path, NHL3 is set to the new next hop IP address, and the process queries the device to ascertain the layer 2 address of NHL3. If NHL2 cannot be resolved, NHL2 is set to "unknown".

At step S10, the current NHL3 address is compared with the destination IP address. If NHL3 is not the destination IP (that is the path identification algorithm is not yet on the final L2 segment), at step S11 the cached topology is used to find the port and device on the end of link, the device is added to the path record and the focus is set to this device. The process then queries (S12) if the focus device is the terminal device. If the focus device is not the terminal device, the process returns to step S5, but using the NHL3 and NHL2 set at step 9.

Termination

The algorithm ends when the terminal device is reached and the terminal port and destination server are added to the path. Other termination conditions prevent the algorithm looping indefinitely. In each iteration of the path, an iteration begins by setting a switched flag to false and a routed flag to false. When a L2 Hop occurs (S7) the switched flag is set to true; when a L3 Hop occurs (S9) the routed flag is set to true. As already mentioned, the egress port is determined from a focus device and the network topology is used to find the attached device and ingress port of the attached device. For each iteration, the combination of:

"Focus device, NHL2, NHL3" is stored.

If the focus device, NHL2 or NHL3 have changed and the new combination of "focus device, NHL2, NHL3" has been seen before, a loop detected event is raised and the loop is stopped. If the loop limit has not been reached, and either routing or switching has occurred (i.e. either the routed or switched flags are true) and the focus device is not equal to the terminal device, iterate again. Each time it is assessed if the iteration loop limit has been reached. If it has, the algorithm terminates.

When iteration ceases, if the focus device is the terminal device, the terminal device is added to the path. If the focus device is not the terminal device, but the algorithm has stopped, an error is reported as the path finding algorithm will have terminated at an unexpected location. If the terminal device is an access switch, the access switch egress port is added from "locate destination" (S4) to the path and the destination device derived from the access switch egress port is added to the path—the algorithm then ends. If the terminal device equals the destination device, the algorithm ends. The detail of the algorithm will now be discussed in more detail.

Specific Example

Figure 4:
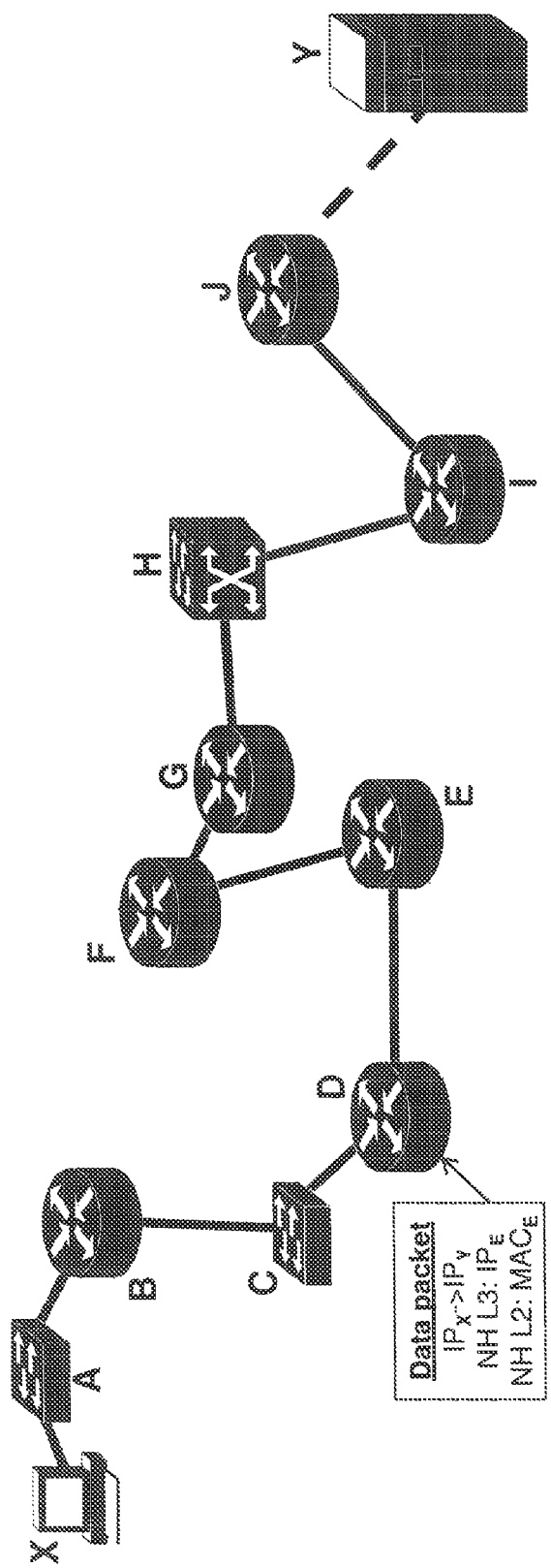
FIG. 4 shows one discovered path.

FIG. 4 shows one result of operation of the path identification algorithm. That is, it provides the route for which a data packet from source device X addressed to destination device Y would take over the network at the time at which the path identification algorithm queries the network. The path is shown to include devices A-J which form part of the path record. The path record includes the ingress and egress ports from each of those devices.

Looking again at the original network of FIG. 1, the first part of the path record shown in FIG. 4 can be seen to be derived from the network of FIG. 1, where corresponding letters have been used to denote the devices selected by the previous switch or routing device. When the path identification algorithm operated, routing device B had determined to send the packet to switch C. However, without use of the present invention, it would have been extremely difficult to work that out in real time. The routing device B similarly had an option to route the packet to router F in the core network. By querying the routing device B in real time (or more or less real time), based on hypothetical packet addressed to destination Y, the routing device B returns the decision that it would have made if a real packet with that address had arrived. By ascertaining that routing device B will despatch the packet to switch C, and then establishing that switch C has connected on the far end of its egress port routing device D, C and D have been added to the path record 81. In this way, the packet identification algorithm has stepped through the path that the hypothetical packet would have taken at the time that the path identification algorithm queries the devices in the network. The box adjacent routing device D denotes the settings for NHL3 and NHL2, that is, NHL3 is set to the IP address of device E which has been established as the far end device for routing device D based on routing table currently active on D, and the NHL2 has been established as the MAC address for device E by querying device D for its ARP entry for device E.

Network Topology

As mentioned previously, the network topology includes both network device interconnectivity and end host location. Network topology 3 can be provided by a topology server which provides details of port-to-port connections. Thus, when an egress port is identified at a device, the ingress port of the connected device can be ascertained using port-to-port connection identified in the topology. Both egress and ingress ports can be added to the path record. The topology server also provides a global CAM, a global ARP and device credentials. Furthermore, for each device recorded in the topology there is preferably an interface index (IfIndex) list, and a VLAN (Virtual Local Area Network) list. They are discussed further herein. When a response is returned to the monitor computer 16, the monitor computer queries the topology 3 in the following order when handling layer 2 responses. In this context, a layer 2 response is a response which has identified an egress port from a layer 2 switch device. The order of querying is CDP, LLDP, STP and SONMP, IPv6 ND.

Locate Source Device

As mentioned earlier, location of the first device in the path (the device connected to the source device) is not necessarily straight forward. In one embodiment, the monitor computer 16 implements the algorithm to firstly try to find the source as a connected host and if that fails it tries to find the source as a network device. When attempting to find the source as a connected host, it queries the source device for the layer 2 (MAC) address for the source IP. This can be accomplished in the same way as the query on a focus device as described above at step S5B. That is, the process dispatches a query to find the ARP entry for the source IP address.

If there is no layer 2 address from the source device, the global cached ARP table at the topology server is queried. In the described embodiment, these are referred to as ARP tables, but any tables which map layer 3 to layer 2 addresses can be utilised. If a MAC address is found which corresponds to the source IP address the topology server is queried for the source IPs MAC location by querying global cached layer 2 forwarding tables on the topology server to find ports which have seen traffic from this MAC address. The topology server is expected to return an unique source MAC location by removing multiple matches (the source MAC seen on many ports), by filtering out ports flagged as trunks, ports with excessive numbers of MACs (access switch ports' FDB entries typically have a single 'seen' MAC address), ports with inter-network topology (e.g. if a port has CDP adjacency information it cannot be a port on an access switch), etc.

If the source cannot be found as a connected host, attempts are made to find the source as a network device. This can be achieved by querying the topology server for all IP addresses found on all managed network devices to see if the IP address is on a network device. If it is, that network device is set as the focus device.

Locate Destination Device

Similar considerations apply to location of the destination device. Firstly attempts are made to find the destination device as a connected host, and if that fails, attempts are made to find the destination as a network device. To find the destination device as a connected host, the destination device is queried for its layer 2 address, or global cached layer 3 to layer 2 mapping tables are queried on the topology server (similarly as for the source device discussed above). Then query global cached layer 2 forwarding tables on the topology server to find ports which have seen traffic from this MAC (again, as described above with reference to the source device location).

To find the destination as a network device if the above fails, the topology server can be queried for all IP addresses found on all managed devices to see if the IP address is on a network device. The network device can then be set as the terminal device.

Per Hop Utility

In order to implement the path identification algorithm, the monitor computer 16 executes a computer program as discussed. This computer program provides a utility which handles "per hop" queries. That is, the identification algorithm relies on dispatching a query from the monitor computer to a focus device and receiving from the focus device an egress port which can be used to access the topology. This cannot necessarily be achieved by a single query. That is in the process of FIG. 23 (with sub process FIG. 27), and FIG. 28 more than one query may be autonomously generated by the loop execution process to achieve a result. The principle of a "per hop" utility is described more clearly with reference to the alternative algorithm mentioned above. As described above, the algorithm requires an initial next hop at layer 3 (NHL3). The utility attempts to query a routing table on the source device for NHL3 and the egress port, using the destination IP address. If no route is found, it queries the routing table on the access switch in case it is a layer 3 switch (which is the first device connected to the source device for NHL3). If no route is found the source device is queried for the default gateway for NHL3. If no route is found, the first device is queried for a default gateway.

To query a routing table to find NHL3 (as described above), a route is found for the IP address in question (the 'sought' IP address) by querying the routing device using a speculative keying technique discussed later. If the route is found but no egress port is specified, the next hop IP address is returned and is used as NHL3. If the route is found with an egress interface ifIndex greater than zero, the egress port is returned with the NHL3 address and the egress port is added to the path. If the route is found with the egress interface ifIndex equal to zero, the utility reiterates by setting the sought IP to the next hop IP (from the previous query) and finding the route for the sought IP by querying the device using speculative keying (as discussed later). This is repeated until the ifIndex returned is non-zero.

The step of finding the route for the sought IP uses the speculative keying technique to return a route entry. If the route entry is found, the utility polls for the next hop address from ipRouteNextHop.NetworkAddress. The utility also polls for the egress interface from ipRouteIfIndex.NetworkAddress and polls for ipRouteType.NetworkAddress. If ipRouteType is 'direct', the sought IP is set to the next hop, as an IP route type of direct indicates that it is directly connected to the network segment.

It is possible that multiple matches will be returned from a routing table on a device. In that case, it is appropriate to determine if multiple routes are being used, for example, when a device is responsible for load balancing traffic. If only a single route is actively being used, the active route should be determined. If multiple routes are being used, the path could be split at this point and the path record could contain the results of the path finder algorithm applied to each and every route found from this point onwards. In many cases, multiple options for routing at a device is indicative of a device which is intelligently routing based on various metrics. These metrics can also be queried and returned for recording at the monitor computer.

The utility is also responsible for finding the initial next hop at layer 2 by querying the layer 3 to layer 2 mapping table 91 at the focus device. If the layer 2 address is not found, where the focus device is the source device, the utility queries the access switch (if it is a layer 3 switch it should provide a layer 3 to layer 2 mapping). If the layer 2 address is not found the utility queries the global cached ARP tables on the topology server 3. A query for a layer 2 address on a device is carried out as explained above with reference to step S5B.

If the NHL 3 address is not on the focus device, the utility polls the focus device for an egress port for the layer 2 address NHL2. The step of polling the focus device for the egress port NHL2 includes VLAN (Virtual Local Area Network) specific polling. That is, it includes the step of establishing which VLANs the device is participating in according to the topology 3 and as recorded at the device. These VLANs are used to help find forwarding table entries for specific VLANs (FDBs are often partitioned according to which VLAN they are related to—e.g. for Per VLAN Spanning Tree Protocol (PVSTP) it is necessary to perform the FDB queries in the context of each VLAN to try to find a match).

If the egress port is not found from the layer 2 FDB (using either a specific VLAN or the native VLAN) then the utility tries to find which interface heads towards NHL2 from ARP records by polling for ipNetToMediaPhysAddress 71 (FIG. 7). That is, the utility attempts to learn which interface the layer 2 to layer 3 relationship was learned from.

Once the utility has found an egress port using the layer 2 address, it adds the egress port to the path record and uses the topology server 3 to find the remote port attached to the egress port. This remote port is recorded as the ingress port on the next device.

Port Channels/Multiplexed Ports

If no remote port is found, or the egress port name mandates the use of higher or lower layer ports then the utility checks for lower layer ports or higher layer ports. That is, there can be a scenario where there is a mapping of virtual path outputs to physical ports. In order for the path identification algorithm to be successful, it needs to identify a physical egress port for accessing the topology server. In a scenario where the check for lower layer ports reveals the presence of lower layer ports, these lower layer ports can be used as the egress ports and the topology server is accessed to find the remote ports (ingress ports of next device) attached to the egress ports. At this point, the path is split into multiple separate paths, each of which is traced independently from this point on.

If higher layer ports are identified, the higher layer port is used for the egress port. The topology server is used to find the remote port attached to this higher layer egress port.

Next HOP

Set the routed and switched flags to false. Using either the topology server or direct queries to the focus device, ascertain whether or not the focus device hosts the NHL3 IP address on any of its ports. If it does host the NHL3 IP address then the utility then moves on to query the focus device routing table for routes to the destination IP by using the speculative keying technique. If the utility locates a candidate route, the next layer 2 address NHL2 is set by querying the focus device (or global cached ARP tables) for layer 3 to layer 2 mapping and the routed flag is set to true. If NHL3 equals the destination IP then that indicates that the utility has reached the last layer 3 device nearest the destination so there is no need to move off this device yet as the next hop would be a layer 2 hop. Therefore, the utility adds the candidate route's egress ports to the path. If NHL3 does not equal the destination IP, that indicates that it is not on the final layer 2 segment and the candidate route's egress port is added to the path.

If no routing occurred during this iteration (the routed flag is still set to false), then the utility polls the focus device for an egress port for the layer 2 address NHL2. The step of polling the focus device for the egress port NHL2 includes VLAN (Virtual Local Area Network) specific polling (as described above). If the egress port is not found from the layer 2 FDB (using either a specific VLAN or the native VLAN) then the utility tries to find which interface heads towards NHL2 from ARP records by polling for ipNetToMediaPhysAddress 71. That is, the utility attempts to learn which interface the layer 2 to layer 3 relationship was learned from. Once the utility has found an egress port using the layer 2 address, it adds the egress port to the path record and uses the topology server 3 to find the remote port attached to the egress port. This remote port is recorded as the ingress port on the next device. If an egress port is found using either FDB queries or ARP queries, the switched flag is set to true.

If, when querying the topology server, no remote port is found, or the egress port name mandates the use of higher or lower layer ports, then a check for lower or higher layer ports is conducted as described above. If an egress port is found, it is added to the path, the device containing the port is added to the path and the focus device is set to the remote device.

This "Next Hop" step is repeated until either a prescribed limit on the number of iterations is reached or the path comes to an end (i.e. neither switching nor routing occurred).

If the process terminates at the previously identified terminal device and that device is an access switch, the egress port is added from "locate destination" to the path record, and the destination device is added to the path record. If the terminal device is the destination device itself, the utility ends.

FIGS. 11A to 11D show a flow chart of the operation of the utility executed at the monitor computer.

Load Balancer

As mentioned above, if the focus device is the terminal device, the terminal device is added with the destination to the path record. If the terminal device is a load balancer then the virtual IP to server pool mapping for the load balancer is obtained. This allows the server to physical server mapping for the load balancer to be identified. The path is retained as far as the "root" path (until the load balancer device). Then, for each physical server IP address, an additional path discovery utility is run from the load balancer to the physical server IP address, with each additional path pre-pended with the "root" path.

Routing Table Query

One of the factors which make the path algorithm particularly efficient is the ability to generate a query to a routing device efficiently, that is to generate a query to which the routing device can respond in a short amount of time without significant overhead. FIG. 5 illustrates the structure of a linear route table addressable via SNMP. To establish a route to a particular destination, ipRouteDest is the required index into the route table. This is denoted by 48 in FIG. 5. The entries of interest in the table are ipRouteIfindex 50 which defines the egress interface, ipRouteNextHop 52 which defines the IP address of the next hop (next hop IP) and ipRouteType 54 which defines the type of routing entry (invalid/direct/indirect). Access into the table normally requires knowledge of the ipRouteMask 56: this would allow a specific network IP address to be located. However, as can be seen in FIG. 5, the IpRouteMask itself is embedded in the ipRouteEntry and therefore is not known to set up in the query. What is required is to find a match for:

<IP of interest>& <ipRouteMask.X>==<ipRouteDest.X> in order to find the IpRouteDest key 48 which represents the index to the table.

Figure 27:
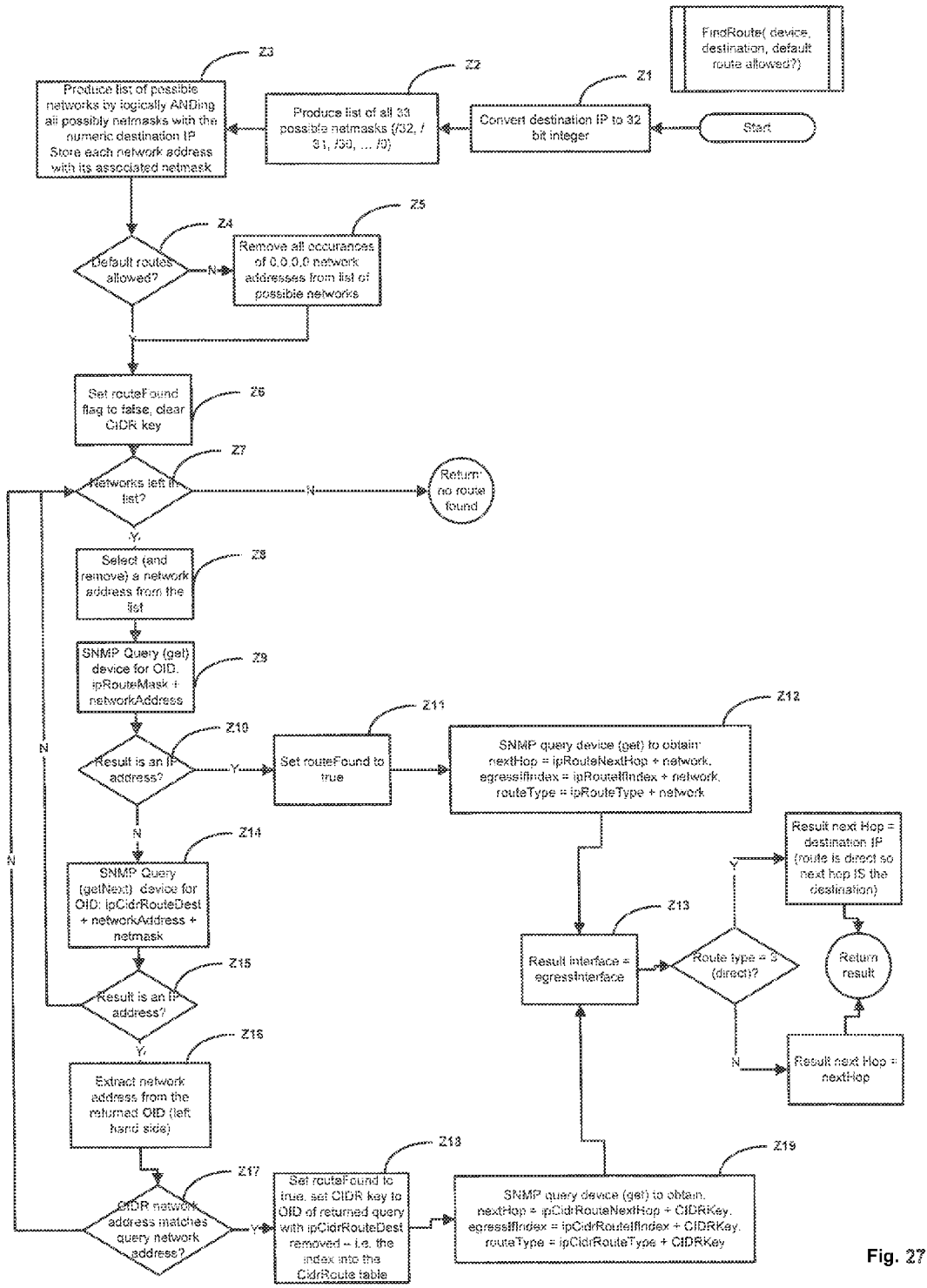
FIG. 27 is a flow chart illustrating a find route process which is utilised in the iterative find route process of Figure P.
Figure 28:
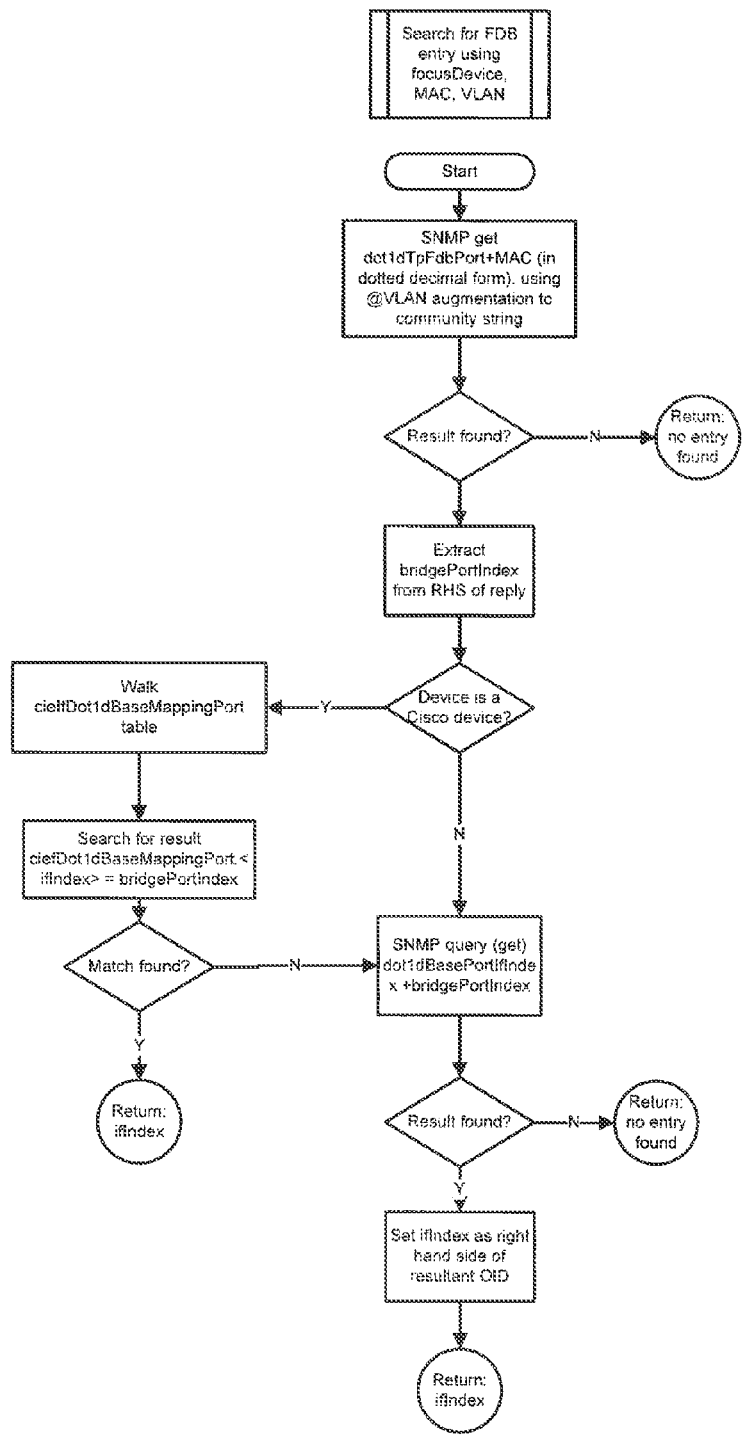
FIG. 28 illustrates a process for searching a forwarding database entry of a focus device.

FIG. 27 illustrates the process

As observed by the inventors, there are only 33 possibilities for the IpRouteMask (/32 . . . 10), that is 255.255.255.255, 255.255.255.254, 255.255.255.252, . . . 0.0.0.0. A number of these produce duplicate network ID's for the same IP address, because of the number of zeros in the IP address. A list of all 33 possible netmasks is produced (Z2), and applied to the IP address (Z3). FIG. 6 shows the application of all 33 netmasks to the IP address 10.44.1.213=0A.2C.01.D5=0000 1010 0010 1100 0000 0001 1101 0101.

This generates 12 unique values (labelled 32, 31, 29, 27, 25, 24, 23, 13, 12, 10, 6, 4). Thus, it is now only necessary to make 12 SNMP queries (which can be presented in a single query packet) to find the route. After Steps Z4 to and Z5 to determine if default routes are allowed and remove networks accordingly, the 12 results are matched into the route table of the focus device and when a match is found the required elements ipRouteIfIndex (egressIfindex), ipRouteNextHop and ipRouteType are retrieved (Z12) and returned in a response to the monitor computer 16.

The result interface is set to egressInterface (Z13).

The reduction in the number of queries required to find the route is termed herein "speculative keying" and enables the undertaking of real time route table querying in a very efficient manner.

When examining real routing tables, it is not uncommon for the route found for a given IP address not to have a valid egress interface and to only provide a next-hop address. In these cases the next hop address is used for a subsequent query of the routing table to try to obtain an egress interface for that next hop address. This re-using of the next-hop address is repeated until an egress interface is obtained.

According to this approach, in a first step a find single route query uses speculative keying to find a routing entry for the specified IP address ($IP_x$) as just outlined. If the associated ipRouteType is "direct", $IP_x$ (and ipRouteIfIndex$_x$) are returned in a response to monitor computer as the next hop. That is, it is directly connected and therefore has no layer 3 next hop.

If the associated ipRouteType is not direct, ipRouteNextHop and ipRouteIfIndex are returned in response to the monitor computer.

The find route process also takes into account IP Classless Inter-Domain Routing tables which are more difficult to query. In this case, if Step Z10 does not result in an IP address, the process moves to Step Z14 where an SNMP query (Get Next) is issued to the device, using IPcidrRouteDest+network address+netmask. If the result is not an IP address, the process loops back to Step Z7 and goes through Steps Z8, Z9, Z10 again. If the result is an IP address, the network address is extracted from the returned OID. It is then determined if the OID's network address matches the query network address. If it does not, the process returns to step Z7. If it does, route found is set to be true, the CIDR key is set to the OID of the returned query with IPcidrRouteDest removed, i.e., the index into the CIDR route table. The process then proceeds to allow an SNMP query to obtain next hop, egress ifIndex and route type.

As shown in Figure P, in the FindRouteIterative process, the FindRoute step F1 is taken for the required IP address ($IP_x$). If no route is found, a failure is returned. If a route is found, but there is no egress interface, ipRouteNextHop is returned. If the route is found and the ipRouteIfindex equals zero, then a subsequent FindRouteIterative step is taken for the IP address of ipRouteNextHop, with the same four possible outcomes.

While speculative keying is a particularly good technique for efficient querying of large data sets, its main applicability is when querying data which is indexed with a derived key for which a partial key is already known. That is why it is particularly useful in the context of SNMP route table analysis and SNMP ARP table querying. However, rapid per network device forwarding behaviour can also be ascertained using other querying techniques, for example, CLI access and XML API.

ARP Query

Reference will now be made to FIG. 7 to describe an efficient technique to query an ARP table using speculative keying. Generation of a query is discussed in more detail later with reference to FIG. 7. For the device being queried, a list of interface indices (IfIndices) is obtained from the network topology or by walking IfIndex from the device itself. Each ifIndex for the device is combined with the NHL 3 address to generate a set of keys for including in the query to the device. Thus, a query containing these keys is formulated and transmitted to the focus device. The focus device produces either zero or one successful response. FIG. 7 illustrates an ipNetToMediaEntry table format which would in principle allow the MAC address to be determined for any given IP address. Since a unique entry cannot be found for a specific IP address unless it is known which interface the ARP entry was learned from, speculative keying is used by combining the IP address with each and every ifIndex on the device. That is, each query key can be created by combining the IP address with an ifIndex. In this way the number of SNMP queries is the number of interfaces on the device which is typically far fewer than the number of ARP entries on the device and thus is significantly more efficient.

In speculative keying, multiple query keys can be contained in a single query message.

Additional Technologies/Protocols

The path identification algorithm when utilised above provides an effective way of identifying a particular path which a particular packet or message is likely to take through the network of interconnected devices operating according to generally known network protocols. Situations do arise where for one reason or another, the path identification algorithm meets a particular challenge. Some of these challenges are discussed in the following.

In some cases, the utility executed in the algorithm has to traverse a Multi-Protocol Label Switched (MPLS) network segment. It accomplishes this by finding the initial label assignment (at the point where the traffic enters the MPLS segment) and tracking across the MPLS network by hopping using per hop details of label popping, pushing and forwarding until the traffic has its final label popped and leaves the MPLS segment.

Another challenge is traversing NAT boundaries which can be accomplished by polling NAT tables of the NAT device. This may require real time speculative polling for dynamic NAT, but it might be possible to use background polling for static NAT.

For tunnel protocols such as IPSEC/GRE/SSL, etc., the utility checks for a direct route from one end of the tunnel to the other (typically with one unknown layer 3 hop representing all of the nodes in-between). The utility further checks for protocol specific topological information and checks in the routing tables/interfaces for the presence of crypto/tunneling hops.

Another challenge is virtualisation. It is important that the algorithm identifies physical egress ports so that a physical device connected to the egress port can be accessed from the topology. Many networks operate at various different layers of virtualisation. Virtual switches can be queried using additional APIs and to ensure that the topology server has timely information on the end host location, it might be necessary for the topology server to integrate with virtualisation management platforms to get updates regarding virtual machine relocation to allow a proactive polling of end host location on affected virtual switches.

The utility negotiates virtualised routing and forwarding tables (VRF) by querying the appropriate IP forward (routing table) required for a specific VRF identifier. In SNMP, for example, this can be done using VRF contextualised community strings.

In other aspects, the invention provides some or all of the following attributes:

A method wherein the destination identifier in the first query is a routing address (L3) of the final destination device.

A method, wherein the destination identifier in the first query is a switching address (L2) derived from a routing address for the first device.

A method which comprises recording a set of devices and ports identified to be in the path in a store accessible to the monitor computer as a path record.

A method wherein the path record includes ingress ports identified from the network topology for identified devices.

A method wherein the query is transmitted from the monitor computer to the device which is being queried in a message which is transmitted over the network.

A method wherein the message takes the form of at least one packet addressed to the device which is being queried.

A method wherein the query includes a plurality of keys for querying the device.

A method wherein a single query containing said plurality of keys causes a response with identification of an egress port to be returned.

A method wherein the first device is identified based on the network topology.

A method, wherein the first device connected to the source device is identified by locating in the network topology a network port on which a switching address of the source device has been seen, and in turn to which device forming part of the network topology this network port belongs.

A method which comprises identifying a first path through the network from the source device to the destination device using a first set of queries at a first time, and additional paths through the network from the source device to the final destination device using subsequent sets of queries.

A method which comprises repeatedly identifying the first and second path and determining usage of the paths.

A method when used in a network of interconnected devices including layer 2 and layer 3 devices, the method comprising, after identifying the first device connected to the source device:

identifying a next layer 3 destination identifier, along the path towards the final destination device; then identifying a layer 2 destination identifier of the next layer 3 destination identifier.

A method wherein;

if the first device hosts the next layer 3 destination identifier, then despatching a query message to the first device containing the destination identifier of the final destination device, in order to ascertain a new next layer 3 destination identifier, along with a new layer 2 destination identifier of this new next layer 3 destination identifier, and the egress port for messages addressed to this new next layer 3 destination identifier.

A method wherein if the first device does not host the next layer 3 destination identifier, then despatching a query message to the first device to ascertain the egress port for messages addressed to the layer 2 destination identifier of the next layer 3 destination identifier, then identifying a new next-hop device connected to the egress port based on a network topology accessible by the monitor computer.

A method, wherein some steps are repeated with each new next-hop device in place of the first device until the new next-hop device is the destination device.

A method comprising:

dispatching a query to the source device, containing the final layer 3 destination identifier, and ascertaining from the response the next layer 3 destination identifier.

A method wherein if the source device does not respond to the query, dispatching a first query to the first device, containing the final layer 3 destination identifier, and ascertaining from the response the next layer 3 destination identifier; then if the first device does not provide identification of the next layer 3 destination identifier via the first query, dispatching a subsequent query to the next-hop device to ascertain a default gateway of the first device and using the default gateway's layer 3 destination identifier as the next layer 3 destination identifier.

A method comprising:
dispatching a query to the source device, containing the next layer 3 destination identifier, and ascertaining from the response the layer 2 destination identifier of the next layer 3 destination identifier.

A method wherein if the source does not respond to the query, dispatching a query to the first device, containing the next layer 3 destination identifier, and ascertaining from the response the layer 2 destination identifier of the next layer 3 destination identifier; then if the first device does not provide the layer 2 destination identifier of the next layer 3 destination identifier, then determining the layer 2 destination identifier of the next layer 3 destination identifier by using a mapping table.

A method wherein each time a next-hop device is identified using the network topology, both the next-hop device and the ingress port on which it will receive messages from the previous device in the path, are recorded as being part of the path together with the previous device and its egress port.

A method wherein the mapping table maps layer 3 addresses to layer 2 addresses.

A method wherein each query is generated for a traffic forwarding table at the device to which the query is transmitted, the query using at least one of a set of keys which have been generated by combining the destination identifier with a plurality of embedded indices of the traffic forwarding table.

A computer system further comprising:
an interface connected to a network of interconnected devices for transmitting queries and receiving responses to a focus device;
a second storage means for storing a path record; and
a third storage means storing a network topology.

Computer program product when recorded on a computer-readable media.

A computer program product in the form of a transmissible signal.

The invention claimed is:

1. A method of executing a loop computer program comprising:
receiving at an execution unit a set of state variables which define an entry state, wherein one of the state variables defines a sequence of loop options;
recording the entry state in a storage unit; and
in the execution unit, executing a first loop option in the ordered sequence of loop options in the entry state, using as parameters at least one of the other state variables in the set of state variables, wherein executing the first loop option comprises cancelling the first loop option from the ordered sequence, carrying out processing steps using at least one state variable, and determining if any of the state variables have altered as a result of the processing steps, wherein:
if none of the state variables have altered, entering a next loop iteration with an entry state in which the first loop option is cancelled from the ordered sequence, revealing a new first loop option, and
if at least one of the state variables has altered, reinstating the cancelled first loop option in the ordered sequence and entering a next loop iteration with an entry state defined by the altered state variable(s) and the original ordered sequence,
whereby each next loop iteration receives a new entry state,
wherein one of the state variables is a routing network address and a further one of the state variables is a switching address,
wherein an option determines if the routing address in the entry state is on the focus device of the entry state and if not uses a mapping table to translate the routing address to a switching address, and
wherein the switching address is used to access a forwarding database to locate an egress port.

2. A method of executing a loop computer program comprising:
receiving at an execution unit a set of state variables which define an entry state, wherein one of the state variables defines a sequence of loop options;
recording the entry state in a storage unit; and
in the execution unit, executing a first loop option in the ordered sequence of loop options in the entry state, using as parameters at least one of the other state variables in the set of state variables, wherein executing the first loop option comprises cancelling the first loop option from the ordered sequence, carrying out processing steps using at least one state variable, and determining if any of the state variables have altered as a result of the processing steps, wherein:
if none of the state variables have altered, entering a next loop iteration with an entry state in which the first loop option is cancelled from the ordered sequence, revealing a new first loop option, and
if at least one of the state variables has altered, reinstating the cancelled first loop option in the ordered sequence and entering a next loop iteration with an entry state defined by the altered state variable(s) and the original ordered sequence,
whereby each next loop iteration receives a new entry state,
wherein one of the state variables is a routing network address and a further one of the state variables is a switching address,
wherein an option locates in a mapping table a mapping entry between the routing address and switching address in the entry state (or new entry state), uses the mapping entry to determine from which interface the mapping entry was derived, and thus derives an egress port.

3. A computer implemented method of identifying in a network of interconnected devices a path through the network from a source device to a final destination device, the path comprising a connected sequence of devices, the method comprising:
at a monitor computer connected to the network, executing a loop computer program comprising:
receiving at an execution unit a set of state variables which define an entry state, wherein one of the state variables defines a sequence of loop options;
recording the entry state in a storage unit; and
in the execution unit, executing a first loop option in the ordered sequence of loop options in the entry state, using as parameters at least one of the other state variables in the set of state variables, wherein executing the first loop option comprises cancelling the first loop option from the ordered sequence, carrying out processing steps using at least one state variable, and determining if any of the state variables have altered as a result of the processing steps, wherein:

if none of the state variables have altered, entering a next loop iteration with an entry state in which the first loop option is cancelled from the ordered sequence, revealing a new first loop option, and if at least one of the state variables has altered, reinstating the cancelled first loop option in the ordered sequence and entering a next loop iteration with an entry state defined by the altered state variable(s) and the original ordered sequence, whereby each next loop iteration receives a new entry state; and further at the monitor computer, using the loop computer program to implement the steps of:

identifying a first device connected to the source device;

transmitting a first query to the first device, the query including a destination identifier and requesting identification of an egress port for messages addressed to the destination identified by the destination identifier when the query is received at the first device;

receiving a result message identifying the egress port and identifying the second device connected to the first device based on a network topology accessible by the monitor computer; and addressing a next query to the second device and receiving a next result message identifying an egress port from the second device; and identifying from the network topology a third device connected to the second device, wherein the path is identified to include the first, second and third devices.

* * * * *